United States Patent
Wang

(10) Patent No.: US 11,293,651 B1
(45) Date of Patent: Apr. 5, 2022

(54) HUMIDIFIER FOR USE WITH A FORCED-AIR HEATING SYSTEM

(71) Applicant: Yong Qiang Wang, Troy, MI (US)

(72) Inventor: Yong Qiang Wang, Troy, MI (US)

( * ) Notice: Subject to any disclaimer, the term of this patent is extended or adjusted under 35 U.S.C. 154(b) by 0 days.

(21) Appl. No.: 17/355,168

(22) Filed: Jun. 22, 2021

(51) Int. Cl.
| | |
|---|---|
| *F24F 3/14* | (2006.01) |
| *F24F 11/89* | (2018.01) |
| *F24F 6/14* | (2006.01) |
| *F24F 110/10* | (2018.01) |
| *F24F 110/20* | (2018.01) |

(52) U.S. Cl.
CPC .................. *F24F 3/14* (2013.01); *F24F 6/14* (2013.01); *F24F 11/89* (2018.01); *F24F 2110/10* (2018.01); *F24F 2110/20* (2018.01)

(58) Field of Classification Search
CPC ...... F24F 3/14; F24F 6/14; F24F 11/89; F24F 2110/10; F24F 2110/20
See application file for complete search history.

(56) References Cited

U.S. PATENT DOCUMENTS

| | | | |
|---|---|---|---|
| 1,982,137 A | * | 11/1934 | Hanley .................. B05B 7/066 239/412 |
| 2,458,064 A | | 1/1949 | Petta |
| 3,262,444 A | | 7/1966 | Davidson |
| 3,334,877 A | | 8/1967 | Payne |
| 3,565,052 A | | 2/1971 | Wallace |
| 3,599,942 A | | 8/1971 | Herr |
| 3,612,033 A | | 10/1971 | Chilcoat |
| 3,635,210 A | | 1/1972 | Morrow |
| 3,640,266 A | | 2/1972 | Ernest |
| 3,689,037 A | | 9/1972 | Payne |
| 3,770,254 A | | 11/1973 | Morrow |
| 3,776,214 A | | 12/1973 | Coffman |
| 3,791,633 A | | 2/1974 | Lowe |

(Continued)

FOREIGN PATENT DOCUMENTS

CN 106996613 A 8/2017

OTHER PUBLICATIONS

TRION® Mister-Mini®, posted at trioniaq.com, archived date Dec. 4, 2011, © Copyright 2011 Trion IAQ, Division of Air System Components, Inc., [online], site visited Jun. 25, 2021. Internet archive available via Wayback Machine, from Internet, <http://web.archive.org/web/20111204155019/http://www.trioniaq.com/products/index.aspx?prod=residential_AES_Mister_Mini>.

*Primary Examiner* — Larry L Furdge
(74) *Attorney, Agent, or Firm* — Inventech Patent Services, LLC; Marc A. Scharich

(57) ABSTRACT

A humidifier for use with a forced-air heating system includes a housing assembly including a mounting frame, a panel configured to be movable between a closed position and an open position with respect to the mounting frame, and a cover attached to the panel. The humidifier further includes a water mist spraying unit carried by the panel. The water mist spraying unit includes at least one spray nozzle. When the panel is in the closed position, the water mist spraying unit extends through a main opening formed in the mounting frame and the at least one spray nozzle of the water mist spraying unit is viewable through at least observation windows of the cover and the panel. When the panel is in the open position, the water mist spraying unit is disposed away from the mounting frame and out of the main opening formed in the mounting frame.

22 Claims, 27 Drawing Sheets

(56) References Cited

U.S. PATENT DOCUMENTS

| | | | |
|---|---|---|---|
| 3,804,388 A | 4/1974 | Jamell | |
| 3,823,926 A | 7/1974 | Bracich | |
| 3,854,468 A | 12/1974 | Nozaki | |
| 3,855,371 A | 12/1974 | Morrow et al. | |
| 3,877,459 A | 4/1975 | Harvey | |
| 3,898,976 A * | 8/1975 | Coffman, Jr. | F24F 6/12 126/113 |
| 4,056,582 A | 11/1977 | Chow | |
| 4,211,735 A | 7/1980 | Berlin | |
| 4,290,274 A * | 9/1981 | Essex | G05D 22/02 62/157 |
| 4,354,985 A | 10/1982 | Johnson | |
| 4,595,139 A | 6/1986 | Levine | |
| 4,967,728 A | 11/1990 | Dueck | |
| 4,986,937 A | 1/1991 | Sorio | |
| 5,075,047 A | 12/1991 | Youngeberg | |
| 5,252,260 A | 10/1993 | Schuman | |
| D342,989 S | 1/1994 | Wallen | |
| 5,368,784 A | 11/1994 | Annestedt, Sr. | |
| 5,765,544 A | 6/1998 | Vigansky, Jr. | |
| 6,572,085 B2 | 6/2003 | Bloemer | |
| 6,588,734 B2 | 7/2003 | Redner et al. | |
| 7,766,310 B2 | 8/2010 | Wolff et al. | |
| D630,310 S | 1/2011 | Beland et al. | |
| 8,006,962 B2 | 8/2011 | Jursich | |
| 8,231,112 B2 | 7/2012 | Cao et al. | |
| 8,292,270 B2 | 10/2012 | Terlson et al. | |
| 8,763,994 B2 | 7/2014 | Seremetis et al. | |
| 9,091,497 B2 | 7/2015 | Schwendinger et al. | |
| 10,808,957 B2 | 10/2020 | Peczalski et al. | |
| 10,871,297 B2 | 12/2020 | Boonstra | |
| 10,900,680 B2 | 1/2021 | Peczalski et al. | |
| 2003/0183955 A1 | 10/2003 | Fields | |
| 2005/0212152 A1 | 9/2005 | Reens | |
| 2010/0207286 A1 | 8/2010 | Jursich | |
| 2015/0300673 A1 | 10/2015 | Dodds et al. | |
| 2016/0138816 A1 | 5/2016 | Flaxer | |

* cited by examiner

HUMIDIFIER FOR USE WITH A FORCED-AIR HEATING SYSTEM

TECHNICAL FIELD

The present disclosure relates generally to devices for use with heating, ventilation, and air conditioning (HVAC) systems and, more particularly, to a humidifier for use with a forced-air heating system.

BACKGROUND

This section provides background information related to the present disclosure which is not necessarily prior art.

Heating, ventilation, and air conditioning (HVAC) systems in buildings, such as homes or other buildings, often include forced-air heating systems. A forced-air heating system heats a building by generating heated air that is circulated to flow throughout the building and is typically used during colder months of the year.

Prolonged use of a forced-air heating system may cause the relative humidity level of the air within a building to be lowered and, as a result, the air within the building may become overly dry. Additionally, the air in certain climates may be naturally dry to begin with, further causing the air within the building to become overly dry. It has been known that overly dry air may cause various adverse effects. Such adverse effects may include respiratory problems, skin problems, shocks from static electricity, cracked wood in flooring or furniture, and various other problems.

In an attempt to alleviate at least some of the various adverse effects that may be caused by overly dry air, various humidifiers have been developed for use in a building, such as a home or other building, which aim to increase the relative humidity level of the air within the building. In this regard, some humidifiers, often referred to as "whole-house" humidifiers, have been developed for use with a forced-air heating system. Such "whole-house" humidifiers may include, for example, drip panel humidifiers (i.e., evaporators), drum humidifiers, steam humidifiers and water mist humidifiers with a single spray nozzle. These existing humidifiers aim to increase the relative humidity level of the air within the building by distributing moisture into the heated air that is circulated to flow throughout the building by the forced-air heating system. Unfortunately, these existing humidifiers often present various challenges and limitations to users and to the forced-air heating systems and buildings that employ them.

For example, in order to install such aforementioned existing humidifiers, a user or other installer typically needs to cut out several large and/or small openings from a component (e.g., an air duct or a supply plenum) of a forced-air heating system.

Furthermore, various additional materials and/or components are often needed to complete the humidifier installation. Therefore, depending on various factors, the humidifier installation may become relatively complicated, costly, and may take several hours or more to complete.

Additionally, most of the aforementioned existing humidifiers are relatively large and/or heavy. Therefore, the possible locations and orientations at which the humidifiers may be installed are typically limited. Moreover, in the case where the aforementioned existing humidifiers include a single spray nozzle for spraying a water mist into a forced-air heating system (e.g., into an air duct), the possible locations and orientations at which such humidifiers may be installed are typically even more limited. For example, such a humidifier is typically required to be installed at a location and orientation such that the single spray nozzle is located within the forced-air heating system downstream (i.e., defined by the flow direction of heated air that flows through the forced-air heating system) relative to an air temperature sensing device (e.g., a thermostat) that communicates with the humidifier. If the single spray nozzle of the humidifier is not located downstream relative to the air temperature sensing device, the water mist sprayed from the single spray nozzle will typically come into direct contact with the air temperature sensing device, thus adversely affecting the accuracy and function of the air temperature sensing device.

Additionally, most of the aforementioned existing humidifiers operate in a relatively inefficient manner with regard to water and electricity use. For example, such aforementioned existing humidifiers that include a single spray nozzle for spraying a water mist into a forced-air heating system (e.g., into an air duct) typically operate in a relatively inefficient manner. Since an amount of water mist that is sprayed from the single spray nozzle is typically not able to be adjusted or optimized, the single spray nozzle often sprays either too little or too much water mist, therefore not achieving efficient evaporation when the water mist is sprayed into heated air that flows through the forced-air heating system. When too much water mist is sprayed inefficiently, water is often wasted, and components of the forced-air heating system may even become damaged. Most of the other aforementioned existing humidifiers, such as drip panel humidifiers (i.e., evaporators), drum humidifiers, and steam humidifiers, are also susceptible to water waste and operating in a relatively inefficient manner. Moreover, most of the aforementioned existing humidifiers are not able to be controlled efficiently and/or do not include electrically-efficient components and, as a result, often use excessive amounts of water and/or electricity during operation.

Additionally, most of the aforementioned existing humidifiers often lack sufficient features that further optimize the humidifiers, such as for use in buildings of different sizes. In this regard, buildings of different sizes often need different amounts of moisture to be efficiently distributed in order to increase the relative humidity levels of the air throughout the buildings in an optimal manner. Therefore, some of the aforementioned existing humidifiers may not even be suitable for use in many buildings.

Additionally, most of the aforementioned existing humidifiers are designed such that the working conditions (i.e., both normal and abnormal) of the humidifiers are not easily observable by users. For example, such aforementioned existing humidifiers that include a single spray nozzle for spraying a water mist into a forced-air heating system (e.g., into an air duct) may experience an abnormal working condition, such as the single spray nozzle becoming partially or fully clogged. Other examples of abnormal working conditions of the aforementioned existing humidifiers may include a drip panel humidifier (i.e., evaporator) experiencing too much or too little water distributed to the drip panel, a drum humidifier experiencing a stoppage of the water pad rotation, and a steam humidifier experiencing a steam distribution that is too heavy or too light. In these aforementioned cases, users will typically be unaware of the abnormal working conditions and may only realize there is a problem with the humidifier once the relative humidity level of the air within a building has been out of a desired range. Moreover, if a user suspects that such an aforementioned existing humidifier is experiencing an abnormal working condition, the humidifier typically needs to be entirely dismounted or otherwise substantially uninstalled from the forced-air heating system in order to diagnose the problem and/or perform maintenance on the humidifier.

Finally, the aforementioned existing humidifiers, during operation or even when idle, typically endure high moisture conditions in dark environments (e.g., inside of an air duct, etc.). As a result, components inside of the humidifiers, along with the surrounding area, are often subject to mold and bacteria growth or exposure.

Therefore, considering all that is discussed above, there is a continuing unaddressed need for a humidifier that may be used with at least a forced-air heating system, and that is capable of overcoming at least the aforementioned challenges and limitations associated with the aforementioned existing humidifiers.

SUMMARY

At least the above-identified unaddressed need is addressed with the present disclosure. This section provides a general summary of the present disclosure and is not a comprehensive disclosure of its full scope or all of its features.

One aspect of the present disclosure is directed to a humidifier for use with a forced-air heating system. The humidifier includes a housing assembly including a mounting frame including a main opening formed therein. The housing assembly further includes a panel configured to be movable between a closed position and an open position with respect to the mounting frame. The panel includes an observation window. The housing assembly further includes a cover attached to the panel. The cover includes an observation window at least generally aligned with the observation window of the panel. Additionally, the humidifier further includes a water mist spraying unit carried by the panel of the housing assembly. The water mist spraying unit includes at least one spray nozzle. When the panel of the housing assembly is in the closed position, the water mist spraying unit extends through the main opening formed in the mounting frame of the housing assembly and the at least one spray nozzle of the water mist spraying unit is viewable through at least the observation windows of the cover and the panel of the housing assembly. When the panel of the housing assembly is in the open position, the water mist spraying unit is disposed away from the mounting frame of the housing assembly and out of the main opening formed in the mounting frame.

Another aspect of the present disclosure is directed to a humidifier for use with a forced-air heating system. The humidifier includes a water mist spraying unit including a main body. The main body includes a water inlet and a plurality of water outlets. The main body further includes at least one water flow channel formed therein in fluid communication with the water inlet and the plurality of water outlets. The water mist spraying unit further includes a plurality of spray nozzles removably attached to the plurality of water outlets of the main body, respectively.

Yet another aspect of the present disclosure is directed to a humidifier for use with a forced-air heating system. The humidifier includes a water mist spraying unit including a main body and at least one spray nozzle in fluid communication with the main body. Additionally, the humidifier further includes an air temperature sensor. At least a portion of the air temperature sensor is disposed within the main body of the water mist spraying unit.

Yet another aspect of the present disclosure is directed to a humidifier for use with a forced-air heating system. The humidifier includes a water mist spraying unit including a main body and at least one spray nozzle in fluid communication with the main body. The at least one spray nozzle is capable of spraying a water mist into heated air that flows through the forced-air heating system. Additionally, the humidifier further includes an air temperature sensor capable of sensing a temperature of the heated air that flows through the forced-air heating system. The air temperature sensor is positioned so as to be capable of being shielded from the water mist, when the water mist is sprayed from the at least one spray nozzle of the water mist spraying unit into the heated air that flows through the forced-air heating system, regardless of a flow direction of the heated air that flows through the forced-air heating system.

Yet another aspect of the present disclosure is directed to a humidifier for use with a forced-air heating system. The humidifier includes a housing assembly including a mounting frame including a main opening formed therein. The mounting frame further includes a lighting unit support portion disposed adjacent to the main opening formed in the mounting frame. The lighting unit support portion includes at least one light source opening formed therein. The housing assembly further includes a cover attached thereto. Additionally, the humidifier further includes a water mist spraying unit carried by the housing assembly so as to be capable of extending through the main opening formed in the mounting frame of the housing assembly. Additionally, the humidifier further includes a lighting unit including at least one light source. The lighting unit is disposed at the lighting unit support portion of the main frame of the housing assembly such that the at least one light source is capable of emitting light through the at least one light source opening formed in the lighting unit support portion of the main frame of the housing assembly.

Yet another aspect of the present disclosure is directed to a humidifier for use with a forced-air heating system. The humidifier includes a water mist spraying unit. Additionally, the humidifier further includes an electronically controlled water supply valve in fluid communication with the water mist spraying unit. Additionally, the humidifier further includes a main controller in electrical communication with the electronically controlled water supply valve. The main controller is configured to be in further electrical communication with at least one electronically controlled water supply valve of at least one auxiliary humidifier which is different from the humidifier. The at least one auxiliary humidifier is also for use with the forced-air heating system.

BRIEF DESCRIPTION OF THE DRAWINGS

The present disclosure will become more fully understood from the detailed description and the accompanying drawings, wherein.

DETAILED DESCRIPTION

Figure 1A:
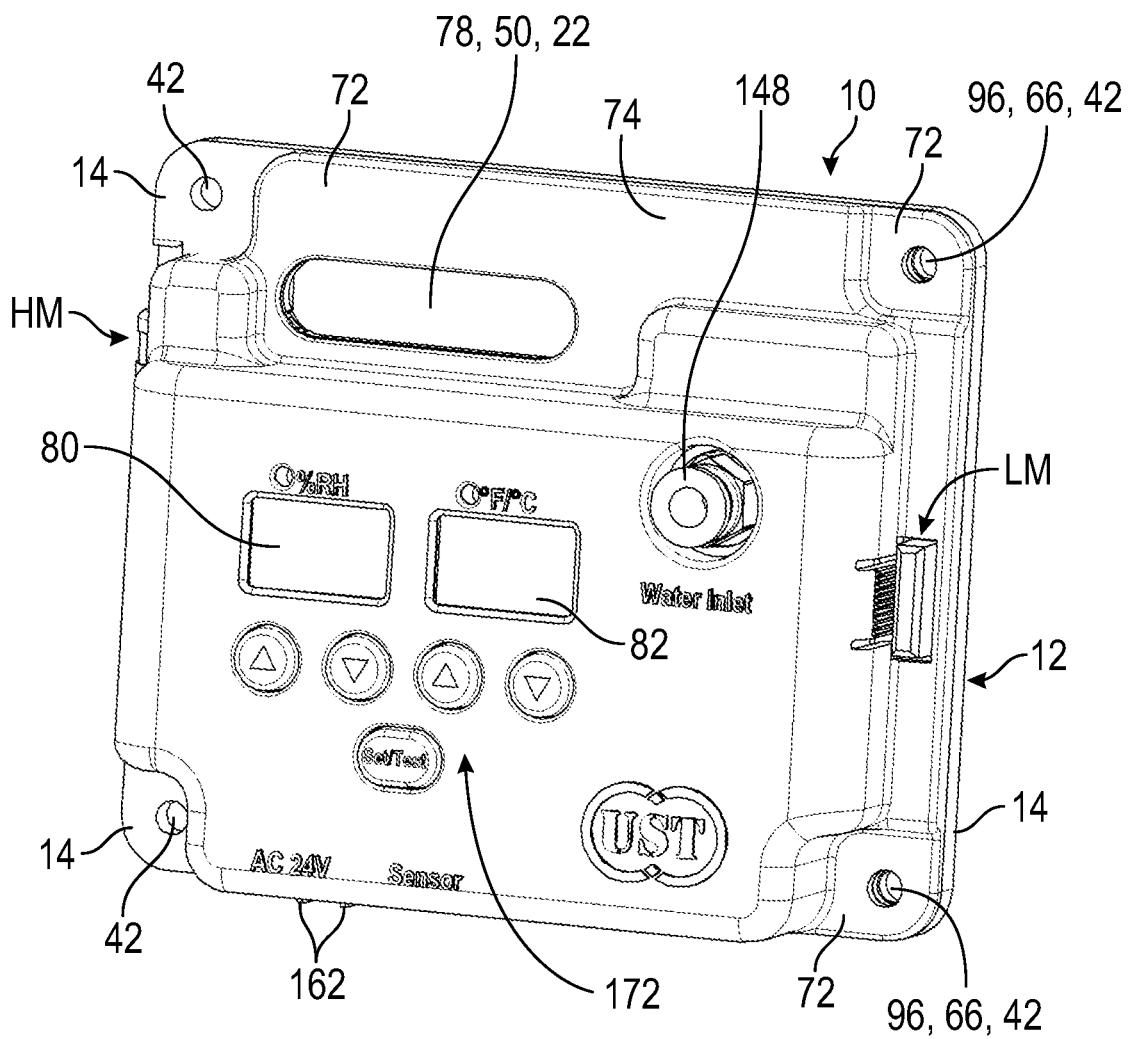
FIG. 1A is a front perspective view of an exemplary humidifier for use with a forced-air heating system, showing the humidifier with mounting fasteners removed from the humidifier for purposes of illustration.
Figure 1B:
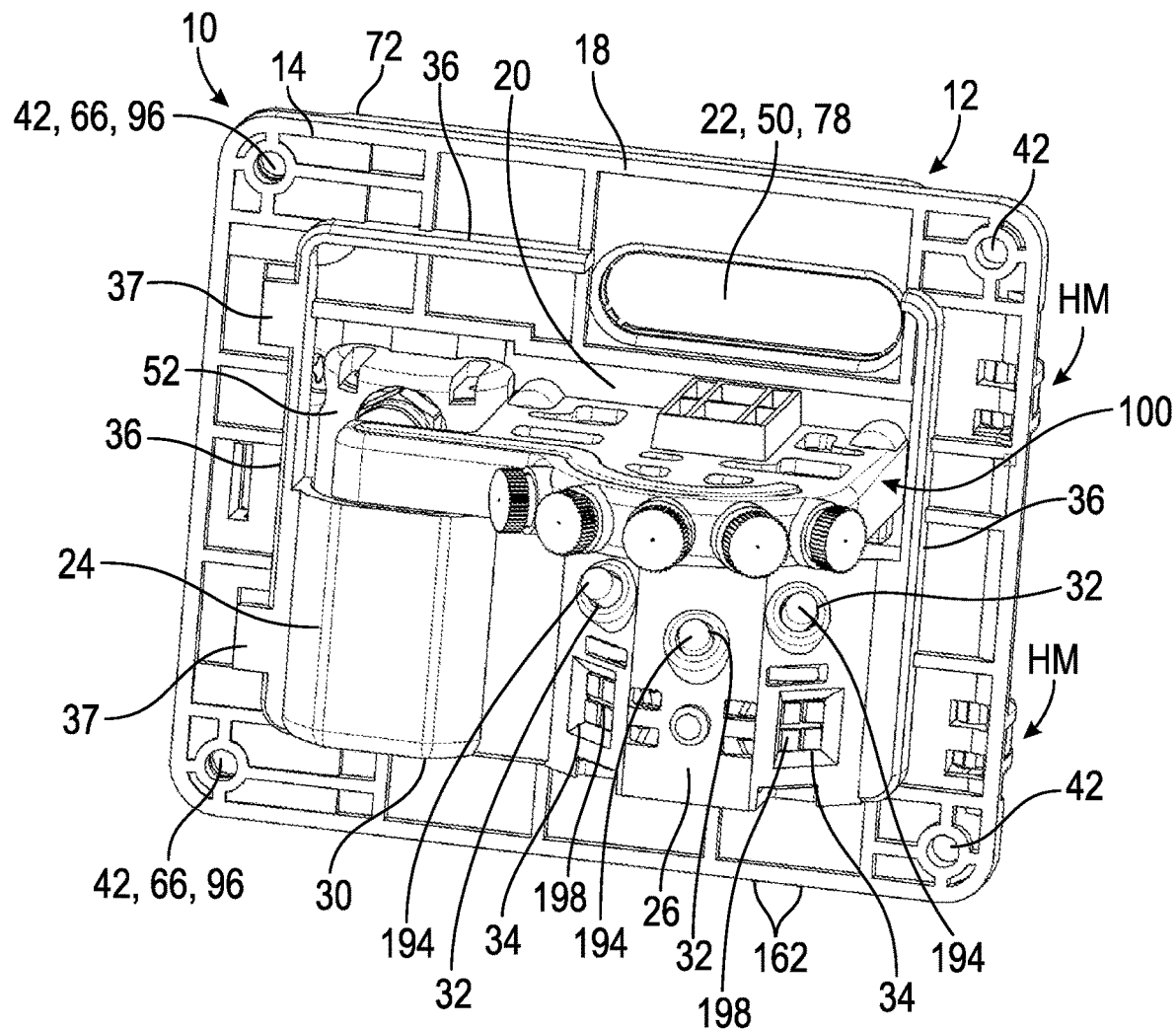
FIG. 1B is a rear perspective view of the humidifier shown in FIG. 1A.

As required, one or more detailed embodiments of the present disclosure are disclosed herein, however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", "upper", "lower", etc. may relate to one or more particular components as seen generally from a user's vantage point during use or operation, and such terms and/or phrases are not to be interpreted as limiting, but merely as a representative basis for describing the present disclosure to one skilled in the art.

Referring generally to the figures, an exemplary humidifier 10 according to the present disclosure is collectively shown and further described herein. The humidifier 10 may be used with a heating, ventilation, and air conditioning (HVAC) system in a building, such as a home or other building, to distribute moisture and increase the relative humidity level of the air within the building. More specifically, as a non-limiting example, the humidifier 10 may be used with a forced-air heating system in a building, such as an exemplary forced-air heating system 200, as will be further shown and described herein. The humidifier 10 may primarily include at least a housing assembly 12, a water mist spraying unit 100, an electronically controlled water supply valve 142, an air temperature sensor 152, a control printed circuit board assembly (PCBA) 156, a spray nozzle lighting unit 188 and a sterilization lighting unit 196, as will be further shown and described herein.

Referring to at least FIGS. 1A-4E, 10 and 13, the housing assembly 12 of the humidifier 10 may be mounted on the forced-air heating system 200, as will be further discussed later in more detail. The housing assembly 12 may primarily include a mounting frame 14, a panel 44 and a cover 72, as will now be further described in more detail herein.

Referring to at least FIGS. 1A-3, 4D, 4E and 10, the mounting frame 14 of the housing assembly 12 will now be described in further detail. The mounting frame 14 may be attached to a component 202, such as an air duct or a supply plenum, of the forced-air heating system 200 at or near a cutout 204 formed in the component 202 of the forced-air heating system 200, as will be further discussed later in more detail. The mounting frame 14 has at least a front side 16 and a rear side 18. As shown particularly in FIG. 4E, the mounting frame 14 may include a main opening 20 formed therein. The mounting frame 14 may further include an observation window 22 disposed adjacent to (e.g., above) the main opening 20 formed in the mounting frame 14. As a non-limiting example, the observation window 22 may be generally elongated. Moreover, the observation window 22 may be an opening formed in the mounting frame 14 that is entirely open or that is entirely covered with a transparent material such as a glass, a transparent plastic (e.g., a polycarbonate (PC), an acrylic (PMMA), etc.) or the like, as may be understood by one skilled in the art. As shown particularly in FIGS. 4D and 4E, the mounting frame 14 may further include a generally concave receiving portion 24 and a generally recessed lighting unit support portion 26, each disposed adjacent to (e.g., below) the main opening 20 formed in the mounting frame 14. The generally concave receiving portion 24 and the generally recessed lighting unit support portion 26 may be formed between, and integrally with, respective generally horizontal upper and lower ribs or wall portions 28, 30 of the mounting frame 14. Moreover, the generally concave receiving portion 24 and the generally recessed lighting unit support portion 26 may each protrude rearwardly away from at least the front and rear sides 16, 18 of the mounting frame 14. As shown particularly in FIGS. 1B, 2B and 4E, the generally recessed lighting unit support portion 26 may include a plurality of LED light source openings 32 and a plurality of UV-C light source openings 34 formed therein. As shown particularly in FIGS. 1B and 2B, the mounting frame 14 may further include one or more ribs or wall portions 36 protruding rearwardly away from at least the rear side 18 of the mounting frame 14. A plurality of securing tabs 37 may extend laterally from the one or more ribs or wall portions 36. The one or more ribs or wall portions 36, together with the securing tabs 37 and the generally horizontal lower rib or wall portion 30, may be arranged proximate to, or seated against, edges of the cutout 204 formed in the component 202 of the forced-air heating system 200 when the mounting frame 14 is attached to the component 202 of the forced-air heating system 200, as will be further discussed later in more detail. As shown particularly in FIG. 4E, the mounting frame 14 may further include a first part 38 (e.g., a protrusion) of a latch mechanism LM of the housing assembly 12, first parts 40 (e.g., receiving sockets) of a hinge mechanism HM of the housing assembly 12 and a plurality of fastener-receiving holes 42 formed therein. The plurality of fastener-receiving holes 42 may receive a respective plurality of mounting fasteners 98 (e.g., sheet metal screws) of the housing assembly 12 therethrough, as will be further discussed later in more detail.

Referring to at least FIGS. 2D, 3, 4B, 4C and 10, the panel 44 of the housing assembly 12 will now be described in further detail. The panel 44 has at least a front side 46 and a rear side 48. The panel 44 may further include an observation window 50. As a non-limiting example, the observation window 50 may be generally elongated.

Figure 10:
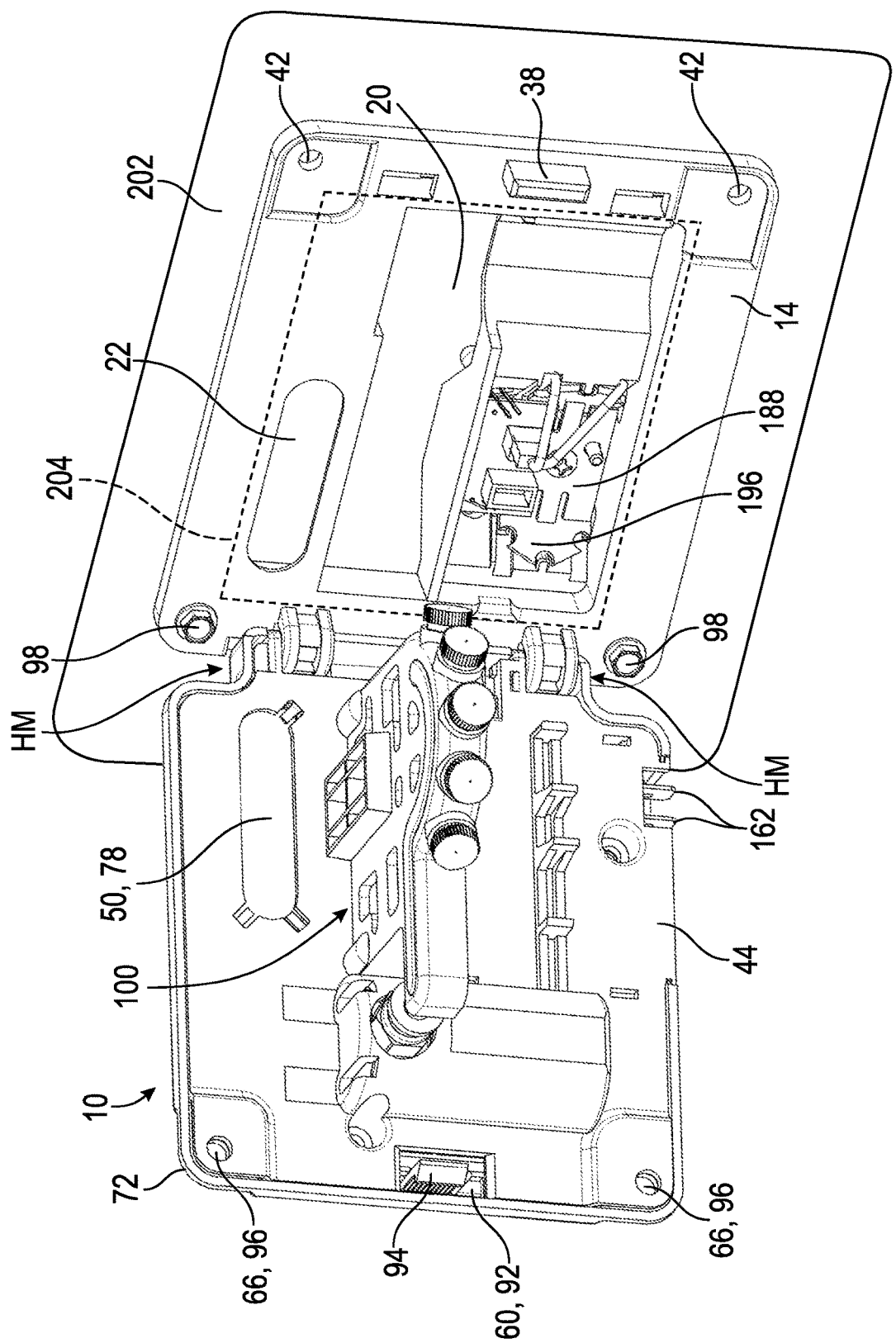
FIG. 10 is a front perspective view of the humidifier mounted on a forced-air heating system (a partial view of a component of the forced-air heating system being shown), showing at least the panel of the housing assembly in an open position.

Moreover, the observation window 50 may be an opening formed in the panel 44 that is entirely open or that is entirely covered with a transparent material such as a glass, a transparent plastic (e.g., a polycarbonate (PC), an acrylic (PMMA), etc.) or the like, as may be understood by one skilled in the art. As shown particularly in FIGS. 4B and 4C, the panel 44 may further include a generally concave water supply valve-receiving portion 52 that may protrude rearwardly away from at least the front and rear sides 46, 48 of the panel 44. The generally concave water supply valve-receiving portion 52 may include a water supply valve outlet opening 54 and a plurality of fastener-receiving holes 55 formed therein. As shown particularly in FIG. 4B, the panel 44 may further include a control printed circuit board assembly (PCBA) support portion 56 disposed adjacent to (e.g., below) the observation window 50 and adjacent to the generally concave water supply valve-receiving portion 52. As shown particularly in FIG. 4C, the panel 44 may further include second parts 58 (e.g., generally vertically-extending pivot posts) of the hinge mechanism HM of the housing assembly 12. As shown particularly in FIG. 10, the second parts 58 of the hinge mechanism HM of the housing assembly 12 may respectively engage the first parts 40 of the hinge mechanism HM of the housing assembly 12, disposed on the mounting frame 14, so as to pivotally couple the panel 44 to the mounting frame 14. In this regard, the panel 44 may be movable (i.e., pivotable) between a closed position (e.g., as shown in FIGS. 1A-2D) and an open position (e.g., as shown in FIG. 10) with respect to the mounting frame 14, as will be further discussed later in more detail. As shown particularly in FIGS. 4B and 4C, the panel 44 may further include a latch mechanism cutout 60 formed therein. In this regard, when the panel 44 is in the closed position, the first part 38 of the latch mechanism LM of the housing assembly 12, disposed on the mounting frame 14, may protrude forwardly through the latch mechanism cutout 60 formed in the panel 44. As shown particularly in FIG. 4B, the panel 44 may further include a plurality of bosses 62, protruding forwardly from the front side 46 of the panel 44, that include a respective first plurality of fastener-receiving holes 64 formed therein. As shown particularly in FIG. 4C, the panel 44 may further include a second plurality of fastener-receiving holes 66, a third plurality of fastener-receiving holes 68 and an air temperature sensor-receiving hole 70 formed therein. The second plurality of fastener-receiving holes 66 may receive some of the plurality of mounting fasteners 98 of the housing assembly 12 therethrough, as will be further discussed later in more detail.

Referring to at least FIGS. 1A, 2A, 2C, 2D, 3, 4A, 10 and 13, the cover 72 of the housing assembly 12 will now be described in further detail. The cover 72 has at least a front side 74 and a rear side 76. The cover 72 may include an observation window 78. As a non-limiting example, the observation window 78 may be generally elongated. As shown particularly in FIGS. 1A, 4A and 13, the cover 72 may further include a first display window 80, through which relative humidity level information may be displayed, and a second display window 82, through which heated air temperature information may be displayed, as will be further discussed later in more detail. The observation window 78 and the first and second display windows 80, 82 may each be an opening formed in the cover 72 that is entirely open or that is entirely covered with a transparent material such as a glass, a transparent plastic (e.g., a polycarbonate (PC), an acrylic (PMMA), etc.) or the like, as may be understood by one skilled in the art. The cover 72 may further include a first LED indicator light source opening 84 formed therein, disposed adjacent to the first display window 80, and a second LED indicator light source opening 86 formed therein, disposed adjacent to the second display window 82. As shown particularly in FIGS. 1A, 2A and 4A, the cover 72 may further include a plurality of user interface openings 88 and a main water inlet opening 90, which may serve as a water supply valve inlet opening 90, formed therein. The cover 72 may further include a latch mechanism cutout 92 formed therein and a second part 94 (e.g., a movable locking tab) of the latch mechanism LM of the housing assembly 12. The cover 72 may further include a plurality of fastener-receiving holes 96 formed therein. The plurality of fastener-receiving holes 96 may receive some of the plurality of mounting fasteners 98 of the housing assembly 12 therethrough, as will be further discussed later in more detail. As shown particularly in FIG. 10, the cover 72 may be attached to the panel 44 of the housing assembly 12 primarily by a plurality of fasteners (not shown). The plurality of fasteners (not shown) may be inserted through the respective first plurality of fastener-receiving holes 64 formed in the panel 44 and secured into portions (not shown) of the cover 72 disposed at or proximate the rear side 76 of the cover 72, as may be understood by one skilled in the art. Moreover, the outer periphery of the rear side 76 of the cover 72 may be shaped and sized slightly larger than the outer periphery of the panel 44. In this regard, as shown particularly in FIG. 10, the panel 44 may advantageously be seated within the attached cover 72 such that a majority of the outer periphery of the panel 44 is circumscribed by the cover 72 in a substantially tight matter. As shown particularly in FIGS. 1B and 2D, with the cover 72 attached to the panel 44, and with the panel 44 in the closed position, the observation window 78 of the cover 72, the observation window 50 of the panel 44 and the observation window 22 of the mounting frame 14 may advantageously be at least generally aligned with one another, or substantially aligned with one another, as will be further discussed later in more detail. Moreover, as shown particularly in FIGS. 2C and 2D, with the cover 72 attached to the panel 44, and with the panel 44 in the closed position, a majority of the outer periphery of the rear side 76 of the cover 72 may press directly against or otherwise engage the front side 16 of the mounting frame 14, thereby advantageously forming a substantially tight fit and seal between the cover 72 and the mounting frame 14 of the housing assembly 12. In this regard, it is to be appreciated that the substantially tight fit and seal between the cover 72 and the mounting frame 14 of the housing assembly 12 is further made possible by at least the generally concave water supply valve-receiving portion 52 of the panel 44 being at least partially received within the generally concave receiving portion 24 of the mounting frame 14. Moreover, with the cover 72 attached to the panel 44, and with the panel 44 in the closed position, the first part 38 of the latch mechanism LM of the housing assembly 12, disposed on the mounting frame 14, may protrude forwardly through the respective latch mechanism cutouts 60, 92 formed in the panel 44 and the cover 72 and the second part 94 of the latch mechanism LM of the housing assembly 12 may engage the first part 38 of the latch mechanism LM, thereby retaining the panel 44, and the attached cover 72, in the closed position. Furthermore, when the panel 44, and the attached cover 72, is to be moved from the closed position into the open position, the second part 94 of the latch mechanism LM may be easily moved (e.g., pushed or pulled) by a user to quickly disengage from the first part 38 of the latch mechanism LM, as will be further discussed later in more detail.

With regard to the overall construction of the housing assembly 12, as a non-limiting example, the mounting frame 14, the panel 44 and the cover 72 of the housing assembly 12 may each be made of a suitable material that is preferably durable and lightweight, such as acrylonitrile butadiene styrene (ABS) plastic, or any other suitable material, by way of a suitable manufacturing process, such as injection molding, or any other suitable manufacturing process, as may be understood by one skilled in the art.

Figure 4C:
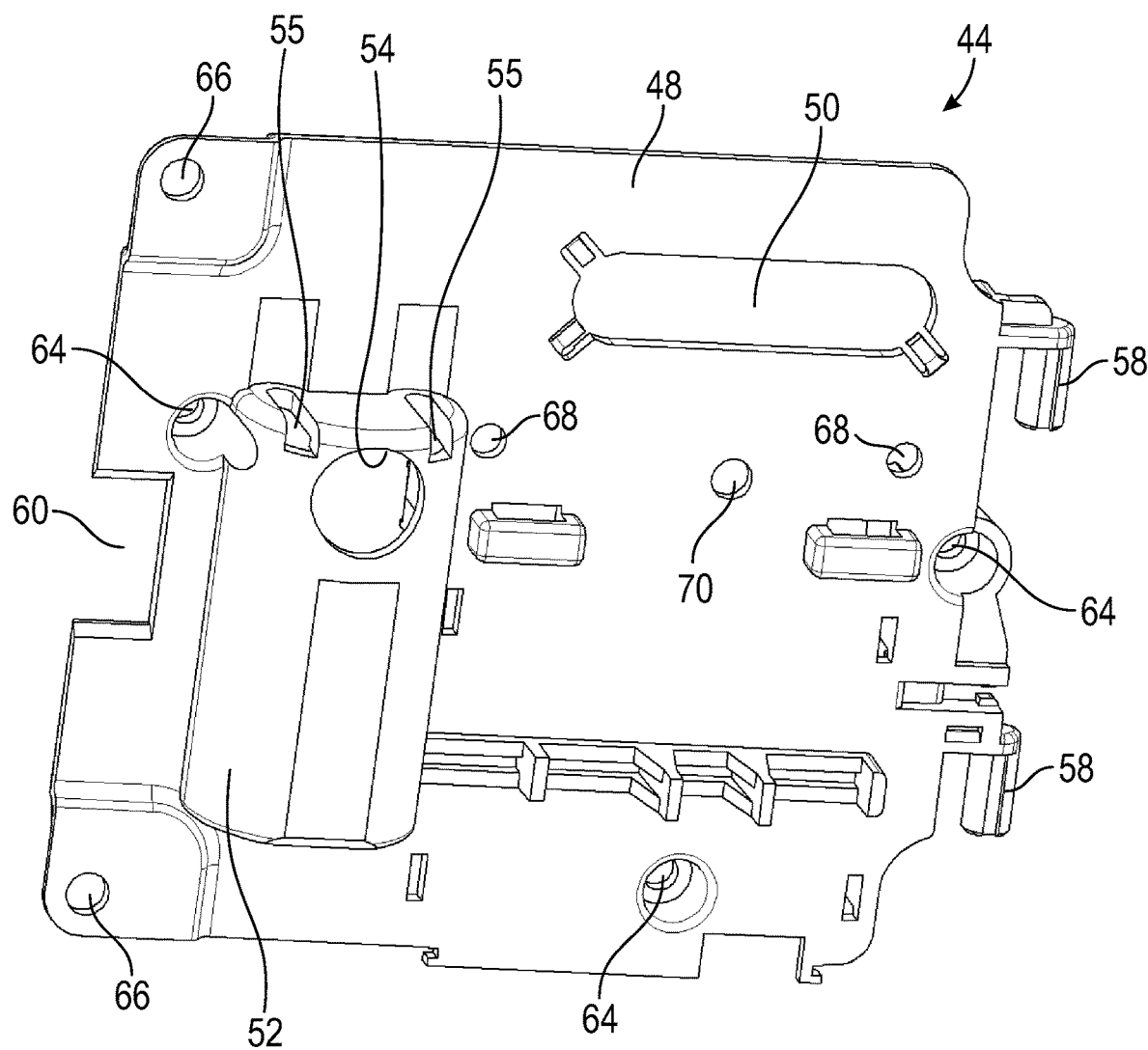
FIG. 4C is a rear perspective view of the panel shown in at least FIG. 4B.
Figure 4D:
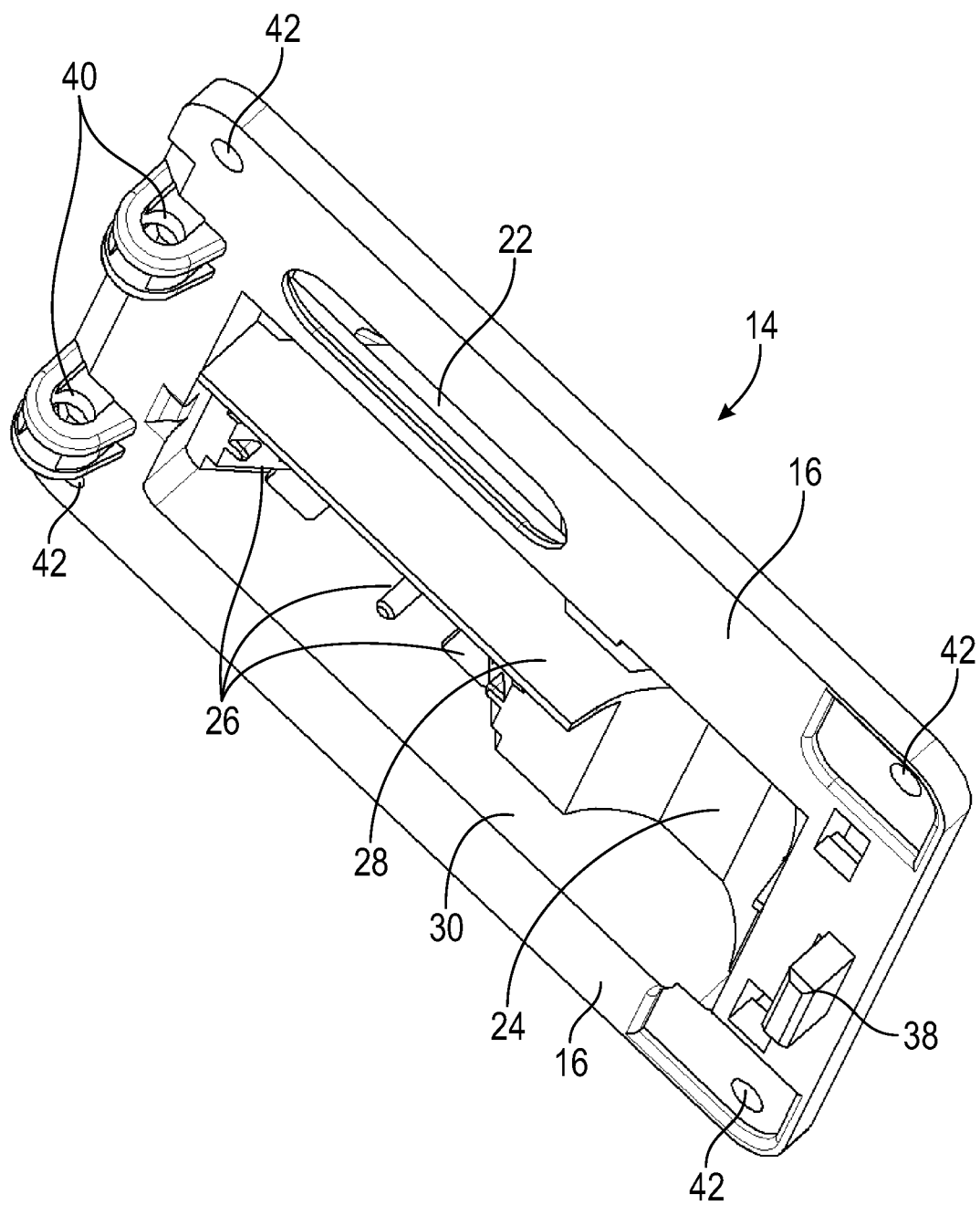
FIG. 4D is a front, top perspective view of a mounting frame of the housing assembly of the humidifier shown in at least FIG. 3.
Figure 4E:
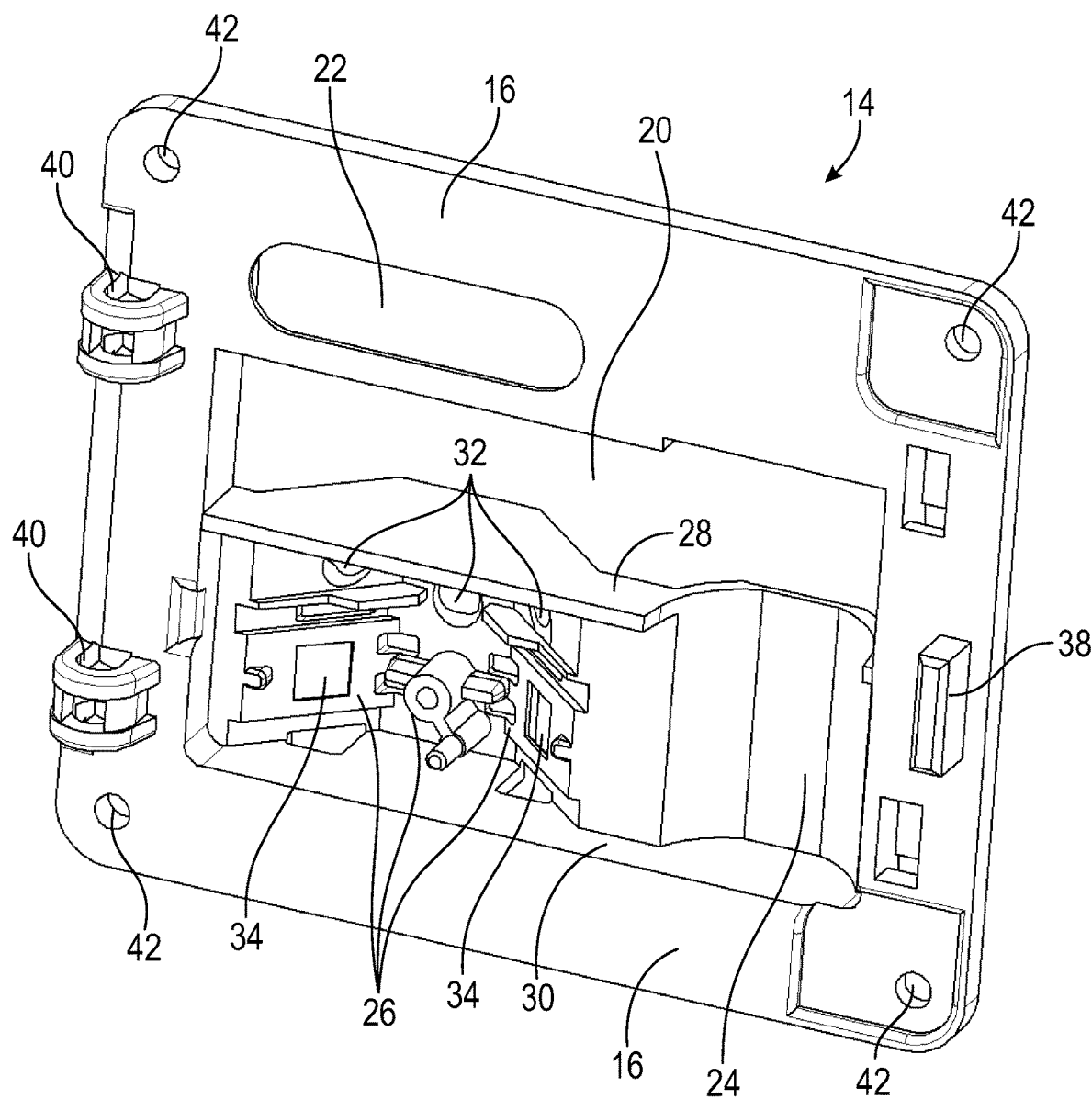
FIG. 4E is a front perspective view of the mounting frame shown in at least FIG. 4D.
Figure 5A:
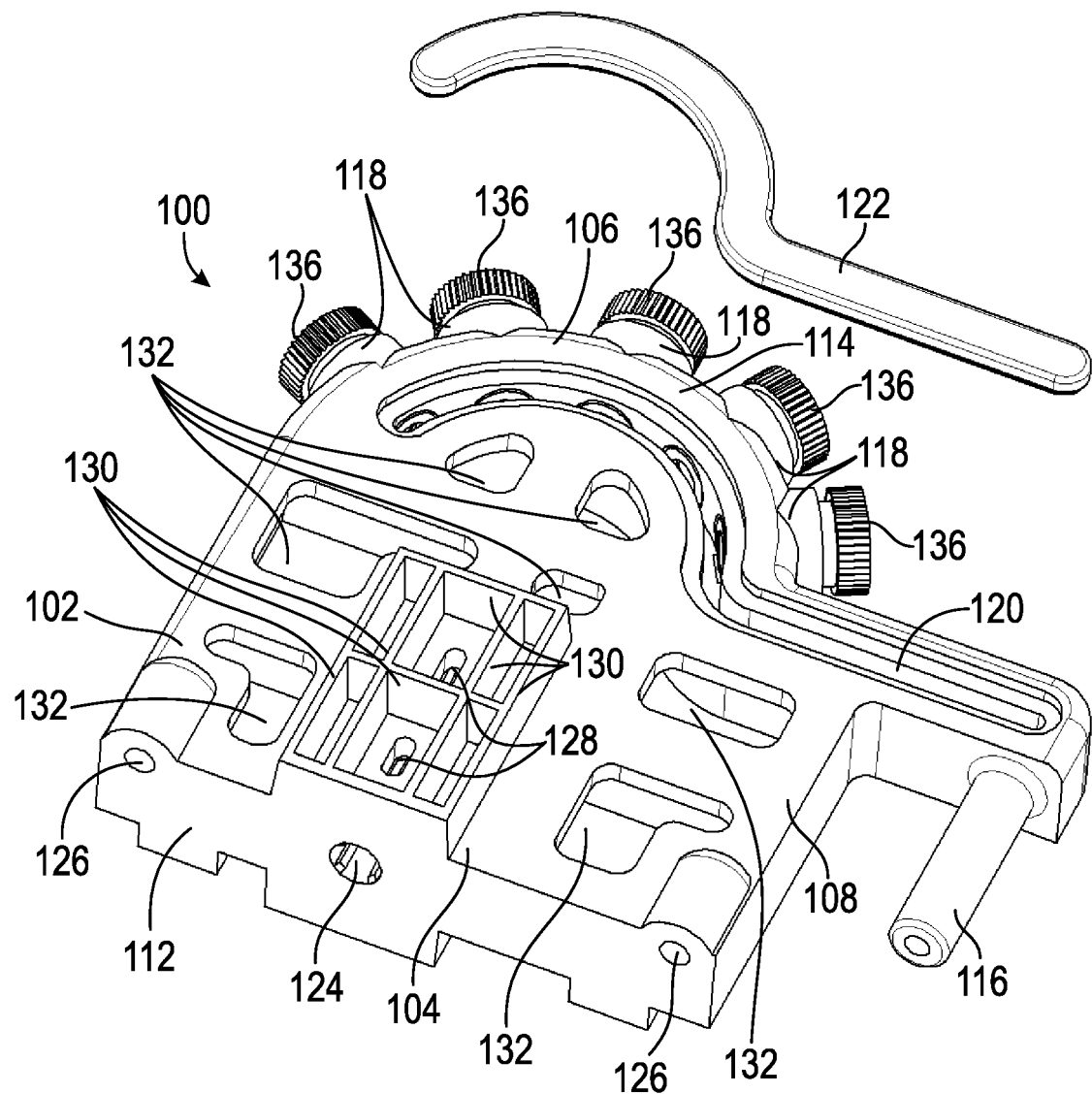
FIG. 5A is a front, top perspective view of a water mist spraying unit of the humidifier shown in at least FIG. 3, showing the water mist spraying unit with an air temperature sensor of the humidifier removed from the water mist spraying unit, and further showing the water mist spraying unit with a water flow channel cap removed and exploded away from a main body of the water mist spraying unit for purposes of illustrating at least one water flow channel of the main body of the water mist spraying unit.
Figure 5B:
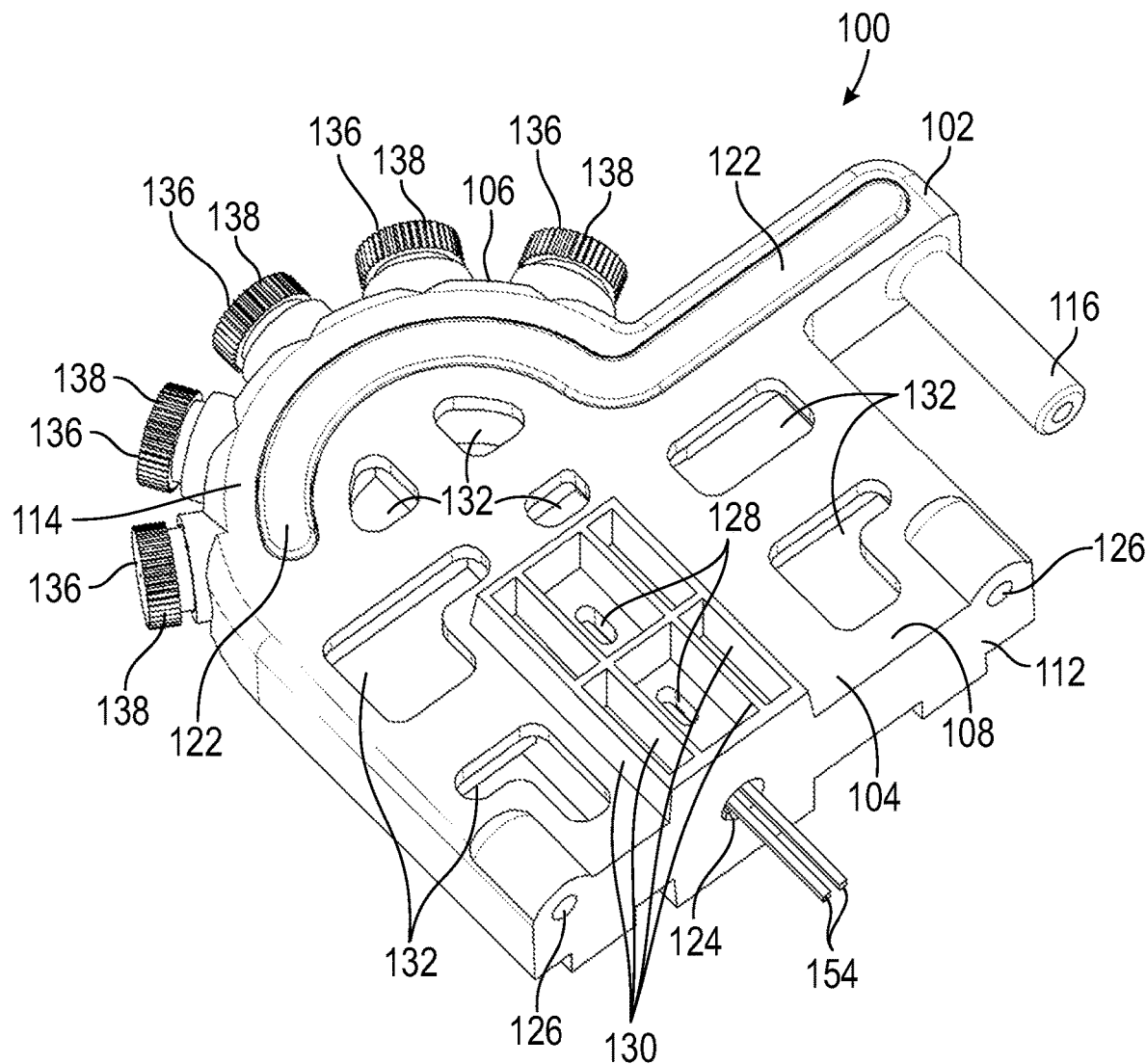
FIG. 5B is another front, top perspective view of the water mist spraying unit shown in at least FIG. 5A, showing the water mist spraying unit with the air temperature sensor installed within the water mist spraying unit, and further showing the water mist spraying unit with the water flow channel cap permanently fixed to the main body of the water mist spraying unit.
Figure 5C:
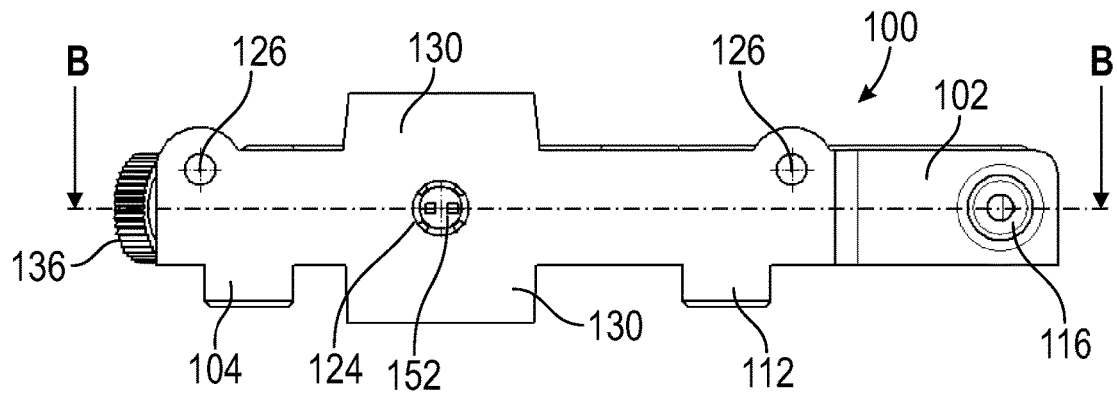
FIG. 5C is a front view of the water mist spraying unit shown in at least FIG. 5B.

Referring to at least FIGS. 1B, 2B-2D, 3, 5A-5E, 10 and 15A-15D, the water mist spraying unit 100 of the humidifier 10 will now be further described in more detail herein. The water mist spraying unit 100 may include a main body 102. The main body 102 has at least a front end 104, a rear end 106, a top side 108 and a bottom side 110. As shown particularly in FIGS. 5A-5E, the front end 104 of the main body 102 may include a substantially flat portion 112 and the rear end 106 of the main body 102 may include an arcuate portion 114, as will be further discussed later in more detail. The main body 102 may further include a water inlet 116. As a non-limiting example, the water inlet 116 may be generally tubular and may protrude forwardly from the main body 102. The main body 102 may further include a plurality of water outlets 118. The plurality of water outlets 118 may be formed in the rear end 106 of the main body 102 along the arcuate portion 114. As shown particularly in FIG. 5D, each of the plurality of water outlets 118 may be internally-threaded, as will be further discussed later in more detail. Moreover, as shown particularly in FIG. 5D, an angle $\alpha 1$ may be defined between respective centerlines CL1 of a centermost water outlet 118 and a farthest-from-center water outlet 118. As a non-limiting example, the angle $\alpha 1$ is preferably 60° maximum, or may be less than 60°, as will be further discussed later in more detail. As shown particularly in FIGS. 5A and 5D, the main body 102 may further include at least one water flow channel 120 formed therein. The at least one water flow channel 120 may extend internally within the main body 102 so as to be in fluid communication with the water inlet 116 and the plurality of water outlets 118. At least a portion of the at least one water flow channel 120 may be disposed proximate the rear end 106 of the main body 102, adjacent to the arcuate portion 114, and may be shaped in an arcuate manner so as to correspond to the arcuate portion 114. As shown particularly in FIG. 5B, the main body 102 may further include at least one water flow channel cap 122 that is shaped and sized to correspond to the at least one water flow channel 120 formed in the main body 102. As a non-limiting example, the at least one water flow channel cap 122 may be permanently fixed to the main body 102, by way of an adhesive or ultrasonic welding, so as to cover and seal (i.e., in a watertight manner) at least a portion of the at least one water flow channel 120. As shown particularly in FIGS. 5A-5E, the main body 102 may further include an air temperature sensor-receiving cavity 124 formed therein. The air temperature sensor-receiving cavity 124 may extend internally within the main body 102 and may intersect the substantially flat portion 112 of the front end 104 of the main body 102, as will be further discussed later in more detail. Moreover, the substantially flat portion 112 of the front end 104 of the main body 102 may include a plurality of fastener-receiving holes 126 formed therein. A plurality of fasteners (not shown) may be inserted through the third plurality of fastener-receiving holes 68 formed in the panel 44 of the housing assembly 12, as shown in FIG. 4C, and secured into the respective plurality of fastener-receiving holes 126 so as to attach the main body 102, and therefore the water mist spraying unit 100, to the panel 44. In this regard, the water mist spraying unit 100 may therefore be carried by the panel 44 of the housing assembly 12. The main body 102 may further include at least one air access opening 128 formed therein, such as a plurality of air access openings 128 disposed at or near both of the top and bottom sides 108, 110 of the main body 102. As shown particularly in FIGS. 5A, 5B and 5E, each of the plurality of air access openings 128 may intersect the air temperature sensor-receiving cavity 124, as will be further discussed later in more detail. The main body 102 may further include at least one wall 130 protruding from the main body 102, such as a plurality of walls 130 disposed at or near both of the top and bottom sides 108, 110 of the main body 102. As shown particularly in FIGS. 5A, 5B, 5D and 5E, the plurality of walls 130 may be disposed proximate the plurality of air access openings 128 formed in the main body 102 and may advantageously at least partially surround, or may fully surround, the plurality of air access openings 128, as will be further discussed later in more detail. The main body 102 may further include a plurality of air flow openings 132 formed therein. As shown particularly in FIGS. 5A, 5B, 5D and 5E, the plurality of air flow openings 132 may be formed in at least the top side 108 of the main body 102. As shown particularly in FIG. 5E, each of the plurality of air flow openings 132 may be at least partially surrounded by a plurality of ribs or walls 134 disposed at or near the bottom side 110 of the main body 102. At least some of the plurality of air flow openings 132 may advantageously be disposed adjacent to at least the air temperature sensor-receiving cavity 124 and the plurality of walls 130, as will be further discussed later in more detail.

As shown particularly in FIGS. 5A-5E, the water mist spraying unit 100 may further include at least one spray nozzle 136, such as a plurality of spray nozzles 136. Each of the plurality of spray nozzles 136 are preferably capable of spraying a fine water mist WM, as will be further discussed later in more detail. As shown particularly in FIG. 5D, each of the plurality of spray nozzles 136 may be externally-threaded so as to be capable of being removably attached to the internally-threaded plurality of water outlets 118 of the main body 102, respectively. In this regard, as a non-limiting example, each of the plurality of spray nozzles 136 may include external teeth 138 or other external textures such that the plurality of spray nozzles 136 may be easily grasped and turned by the user. The plurality of spray nozzles 136 may be removably attached to the plurality of water outlets 118 of the main body 102, respectively, along the arcuate portion 114 of the rear end 106 such that each of the plurality of spray nozzles 136 are aimed in a different respective direction. In this regard, the plurality of spray nozzles 136 may advantageously form a fanned array of spray nozzles 136.

Figure 5D:
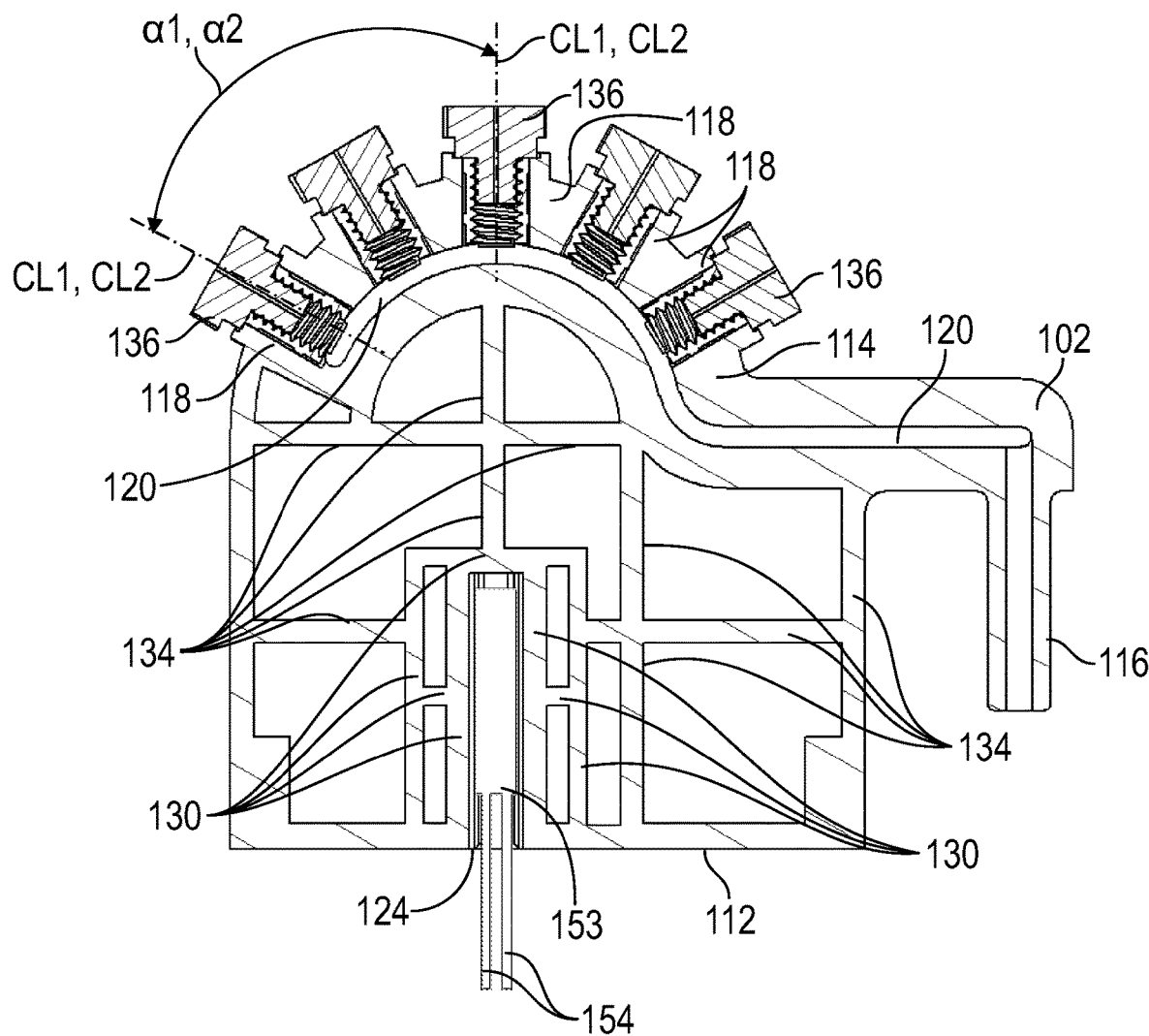
FIG. 5D is a sectional view of the water mist spraying unit taken along line B-B shown in FIG. 5C.
Figure 5E:
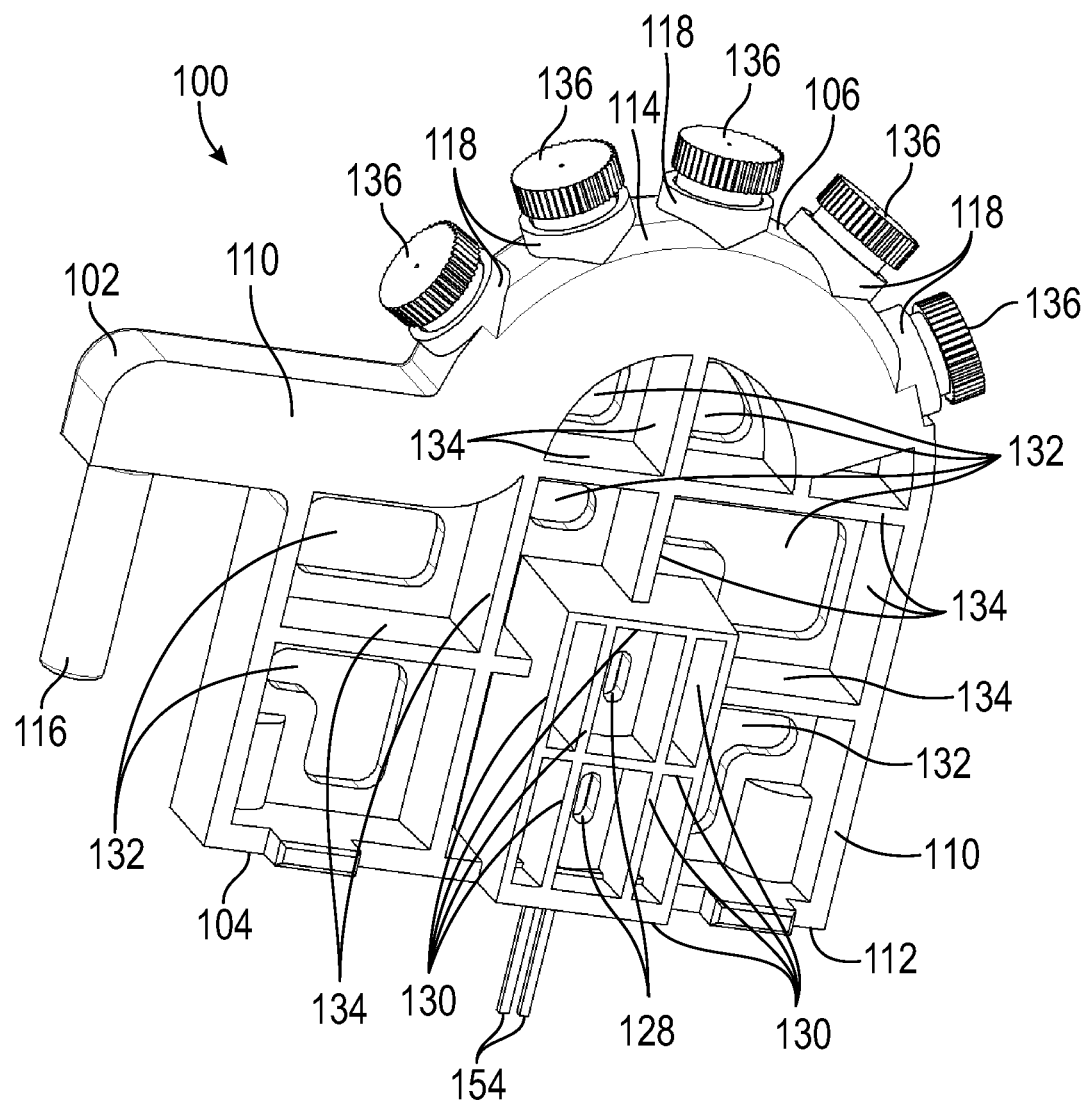
FIG. 5E is a rear, bottom perspective view of the water mist spraying unit shown in at least FIGS. 5B-5D.
Figure 6:
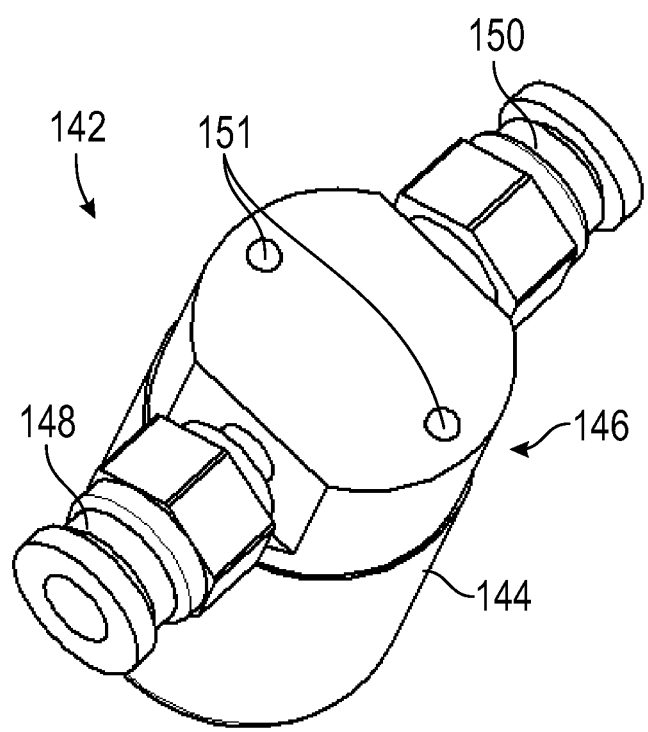
FIG. 6 is a front, top perspective view of an electronically controlled water supply valve of the humidifier shown in at least FIG. 3.
Figure 15A:
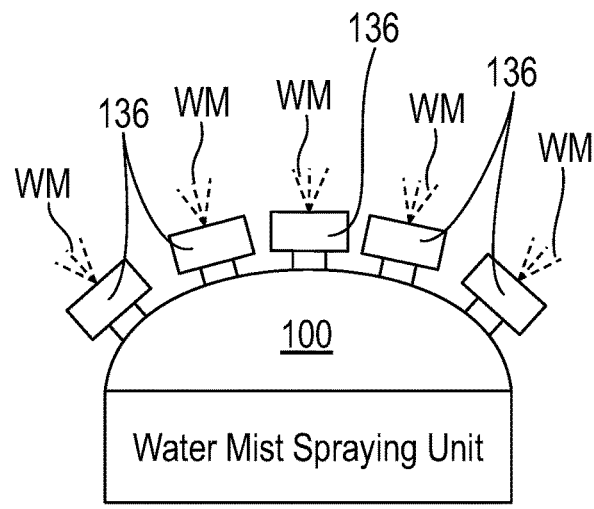
FIGS. 15A-15D are schematic diagrams schematically showing various water mist spray configurations of the water mist spraying unit.
Figure 15B:
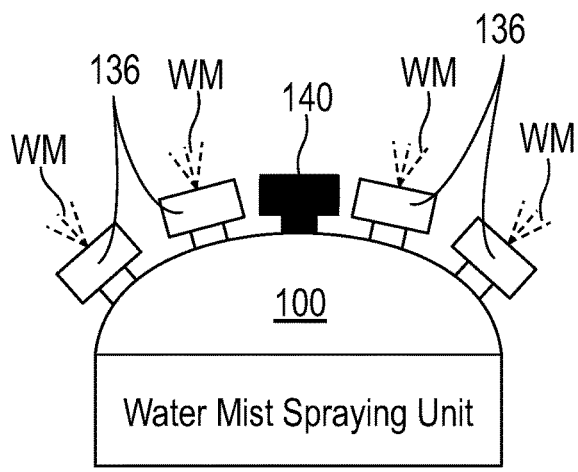
Figure 15C:
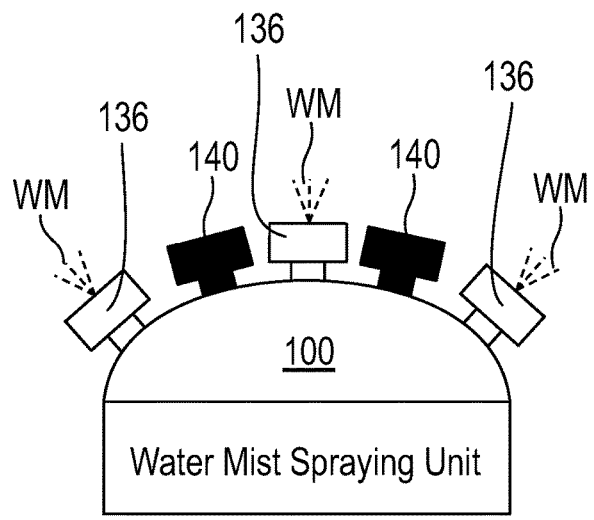
Figure 15D:
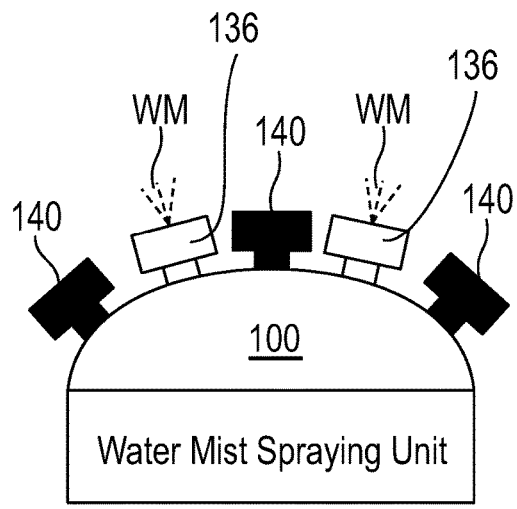

Moreover, as shown particularly in FIG. 5D, an angle α2 may be defined between respective centerlines CL2 of a centermost spray nozzle 136 and a farthest-from-center spray nozzle 136. As a non-limiting example, the angle α2 is preferably 60° maximum, or may be less than 60°, as will be further discussed later in more detail. In this regard, as shown particularly in FIG. 5D, when the plurality of spray nozzles 136 are removably attached to the plurality of water outlets 118 of the main body 102, respectively, the plurality of spray nozzles 136 may be coaxial with the respective plurality of water outlets 118 such that the angle α1 is equal to the angle α2. As schematically shown in FIGS. 15A-15D, the water mist spraying unit 100 may include a different number of spray nozzles 136 removably attached thereto in various water mist spray configurations. More specifically, one or more of the plurality of spray nozzles 136 may be removed (e.g., by the user) from one or more of the plurality of water outlets 118 of the main body 102. The one or more of the plurality of spray nozzles 136 that have been removed from the one or more of the plurality of water outlets 118 of the main body 102 may be replaced with one or more externally-threaded stoppers 140 so as to plug the one or more open water outlets 118, as may be understood by one skilled in the art. FIG. 15A schematically shows a maximum level water mist spray configuration in which none of the plurality of spray nozzles 136 are removed. FIG. 15B schematically shows a level-I reduced water mist spray configuration in which one of the plurality of spray nozzles 136 has been removed and replaced with one stopper 140. FIG. 15C schematically shows a level-II reduced water mist spray configuration in which two of the plurality of spray nozzles 136 have been removed and replaced with two respective stoppers 140. FIG. 15D schematically shows a level-III reduced water mist spray configuration in which three of the plurality of spray nozzles 136 have been removed and replaced with three respective stoppers 140. In this regard, a total amount of water mist WM that is able to be sprayed from the water mist spraying unit 100 may advantageously be adjusted (i.e., increased and reduced) by the user, for reasons that will be further discussed later in more detail.

With regard to the overall construction of the water mist spraying unit 100, as a non-limiting example, the main body 102 of the water mist spraying unit 100 may be made of a suitable material that is preferably durable and lightweight, and that preferably has a relatively low thermal conductivity, such as acrylonitrile butadiene styrene (ABS) plastic, or any other suitable material. Moreover, it is to be appreciated by one skilled in the art that at least the water inlet 116, the plurality of water outlets 118, the at least one water flow channel 120, the air temperature sensor-receiving cavity 124, the plurality of fastener-receiving holes 126, the plurality of air access openings 128, the plurality of walls 130, the plurality of air flow openings 132 and the plurality of ribs or walls 134 of the main body 102 may all be formed monolithically with the main body 102 by way of a suitable manufacturing process, such as injection molding or any other suitable manufacturing process. As previously discussed herein, the at least one water flow channel cap 122 of the main body 102 may be permanently fixed to the main body 102 by way of an adhesive or ultrasonic welding, however, it is to be understood that the at least one water flow channel cap 122 may also be formed monolithically with the main body 102 (i.e., thereby also being permanently fixed to the main body 102) by way of a suitable manufacturing process as previously described herein. In a possible alternative configuration (not shown) in which the main body 102 is devoid of the plurality of air access openings 128, the main body 102 may be made of a suitable material, such as a plastic compound containing highly-conductive additives, or a metal material, that has a relatively high thermal conductivity, by way of a suitable manufacturing process. The plurality of spray nozzles 136 of the water mist spraying unit 100 may be made of any suitable material. As a non-limiting example, the plurality of spray nozzles 136 may be made of brass, by way of a suitable manufacturing process such as casting and/or machining, as may be understood by one skilled in the art. Similarly, as a non-limiting example, the one or more stoppers 140 may be made of any suitable plastic or metal material by a suitable manufacturing process, as may be understood by one skilled in the art.

Referring to at least FIGS. 1A-2C, 3, 4B, 4C, 6 and 10, the electronically controlled water supply valve 142 of the humidifier 10 will now be further described in more detail herein. As shown particularly in FIG. 6, the electronically controlled water supply valve 142 may include a main body 144, an electronically controlled solenoid valve assembly 146 including an electronically controlled solenoid (not shown) disposed internally within the electronically controlled solenoid valve assembly 146, a water inlet 148, which may serve as a main water inlet 148 of the humidifier 10, and a water outlet 150. The electronically controlled water supply valve 142 may further include a plurality of fastener-receiving holes 151 formed therein.

As shown particularly in FIGS. 1A-2C, 3, 4B, 4C and 10, the electronically controlled water supply valve 142 may be seated at least partially within the generally concave water supply valve-receiving portion 52 of the panel 44 of the housing assembly 12. A plurality of fasteners (not shown) may be inserted through the plurality of fastener-receiving holes 55 formed in the generally concave water supply valve-receiving portion 52 of the panel 44 of the housing assembly 12, as shown in FIG. 4C, and secured into the respective plurality of fastener-receiving holes 151 formed in the electronically controlled water supply valve 142 so as to attach the electronically controlled water supply valve 142 to the panel 44. In this regard, the electronically controlled water supply valve 142 may therefore be carried by the panel 44 of the housing assembly 12. As shown particularly in FIGS. 1B and 10, the electronically controlled water supply valve 142 may be disposed between the panel 44 and the cover 72 of the housing assembly 12. More specifically, with the electronically controlled water supply valve 142 attached to the panel 44 of the housing assembly 12, the water outlet 150 of the electronically controlled water supply valve 142 may protrude rearwardly through the water supply valve outlet opening 54 formed in the generally concave water supply valve-receiving portion 52 of the panel 44. Moreover, with the cover 72 attached to the panel 44 of the housing assembly 12, the water inlet 148 of the electronically controlled water supply valve 142 may protrude forwardly and at least partially through the water supply valve inlet opening 90 formed in the cover 72 of the housing assembly 12. As shown particularly in FIG. 2C, the water outlet 150 of the electronically controlled water supply valve 142 may be operably coupled to the water inlet 116 of the main body 102 of the water mist spraying unit 100 in a watertight manner, as may be understood by one skilled in the art. In this regard, the electronically controlled water supply valve 142 may therefore be in fluid communication with the water mist spraying unit 100. The electronically controlled solenoid (not shown) disposed internally within the electronically controlled solenoid valve assembly 146 may be controlled (i.e., actuated) by way of electrical power (i.e., electrical current) supplied thereto such that the electronically controlled water supply valve 142 regulates or otherwise controls (e.g., starts, stops, increases, decreases, etc.) a flow of water supplied to the water inlet 116 of the water mist spraying unit 100, as will be further discussed later in more detail. In a possible alternative configuration, a relatively small electronically controlled water pump (not shown) may be employed instead of the electronically controlled water supply valve 142 so as to regulate or otherwise control a flow of water supplied to the water inlet 116 of the water mist spraying unit 100, but with a higher water pressure, as may be understood by one skilled in the art.

Referring to at least FIGS. 2D, 3, 4C, 5A-5E and 7, the air temperature sensor 152 of the humidifier 10 will now be further described in more detail herein. As shown particularly in FIG. 7, the air temperature sensor 152 may include a main body 153 and one or more connecting posts or wires 154. The air temperature sensor 152 may be operably connected to the control printed circuit board assembly (PCBA) 156 of the humidifier 10 (e.g., by way of the one or more connecting posts or wires 154) so as to be in communication with the control printed circuit board assembly (PCBA) 156, as will be further discussed later in more detail. Moreover, as shown particularly in FIGS. 2D, 4C and 5B-5E, at least the one or more connecting posts or wires 154 of the air temperature sensor 152 may extend through the air temperature sensor-receiving hole 70 formed in the panel 44 of the housing assembly 12, and at least a portion of the main body 153 of the air temperature sensor 152 may be disposed within the air temperature sensor-receiving cavity 124 formed in the main body 102 of the water mist spraying unit 100. In this regard, as shown in FIG. 5D, the entire main body 153 of the air temperature sensor 152 may advantageously be disposed within the air temperature sensor-receiving cavity 124 formed in the main body 102 of the water mist spraying unit 100, as will be further discussed later in more detail. As a non-limiting example, the air temperature sensor 152 may be a resistance temperature detector (RTD) type of sensor, or any other suitable high-precision sensor that is capable of sufficiently sensing an air temperature.

Figure 12:
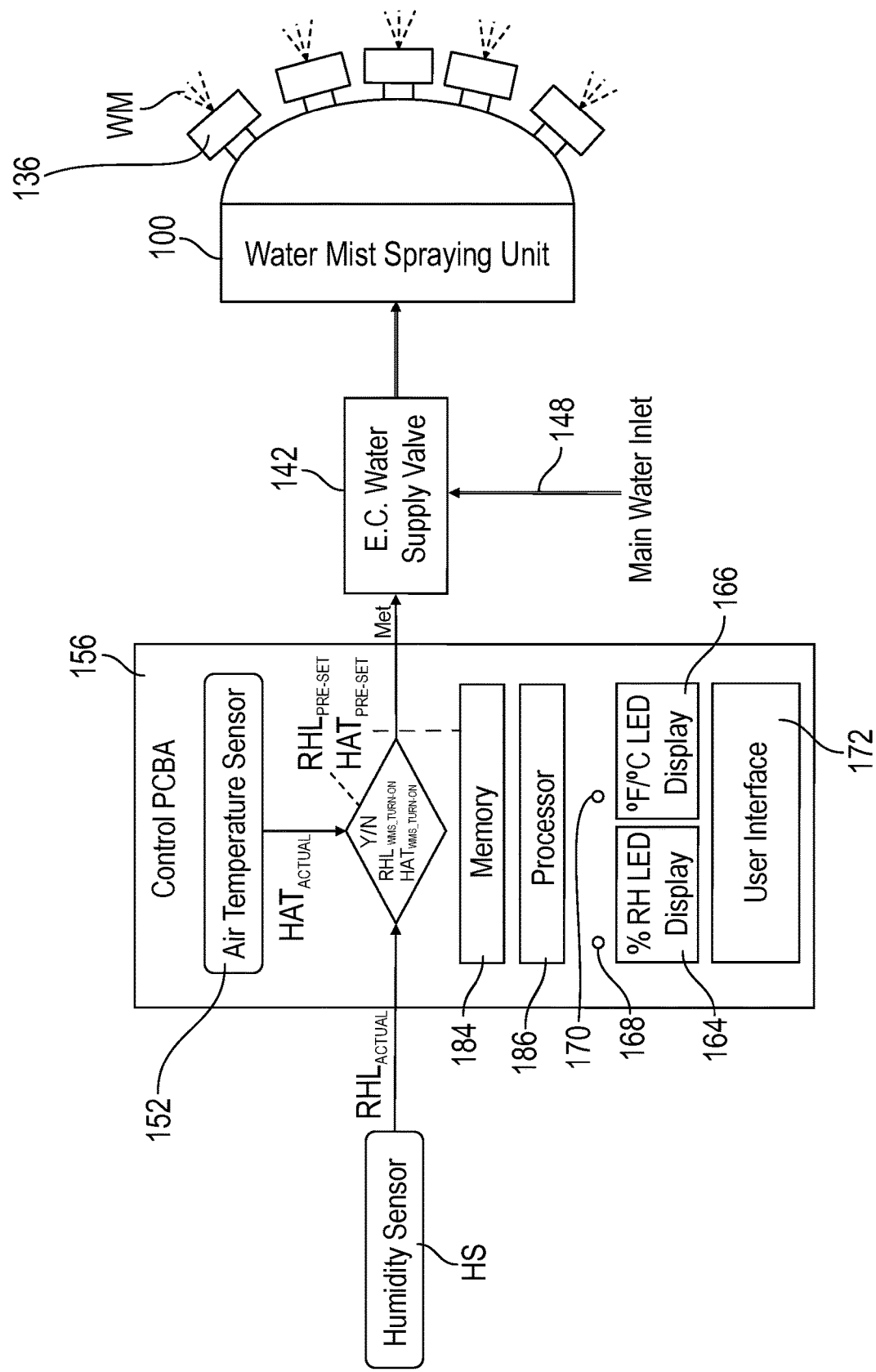
FIG. 12 is a schematic diagram schematically showing a relationship between a humidity sensor, the air temperature sensor, the control printed circuit board assembly (PCBA) and the electronically controlled water supply valve of the humidifier.

Referring to at least FIGS. 1A, 2A, 2C, 2D, 3, 4A, 4B, 7, 12, 13 and 16, the control printed circuit board assembly (PCBA) 156 of the humidifier 10 will now be further described in more detail herein. The control printed circuit board assembly (PCBA) 156 may serve as a main controller 156 of the humidifier 10 and may also advantageously serve as a main controller 156 of at least one auxiliary humidifier 10', such as one or more auxiliary humidifiers 10' (if optionally installed) which are different from (i.e., not the same as) the humidifier 10, as will be further discussed later in more detail. As shown particularly in FIGS. 7 and 12, the control printed circuit board assembly (PCBA) 156 may include a printed circuit board (PCB) 158 including at least one fastener-receiving hole 160 formed therein, a plurality of electrical connectors 162, an air temperature sensor connector 163, a humidity sensor connector (not shown), a first LED display 164 that is capable of displaying at least relative humidity level information, a second LED display 166 that is capable of displaying at least heated air temperature information, a first LED indicator light source 168 disposed adjacent to (e.g., above) the first LED display 164, a second LED indicator light source 170 disposed adjacent to (e.g., above) the second LED display 166 and a user interface 172, as will be further discussed later in more detail. As shown particularly in FIGS. 7, 12 and 13, the user interface 172 may include a first up (i.e., increase) adjustment button 174 and a first down (i.e., decrease) adjustment button 176 disposed adjacent to (e.g., below) the first LED display 164. The user interface 172 may further include a second up (i.e., increase) adjustment button 178 and a second down (i.e., decrease) adjustment button 180 disposed adjacent to (e.g., below) the second LED display 166. The user interface 172 may further include a Set/Test button 182, as will be further discussed later in more detail. The control printed circuit board assembly (PCBA) 156 may further include an integrated circuit and/or logic so as to be capable of performing the various controlling functions described herein. In this regard, as schematically shown in FIG. 12, the control printed circuit board assembly (PCBA) 156 may further include a memory 184 (e.g., capable of storing a set of executable instructions) and a processor 186 (e.g., configured to execute the executable instructions), as may be understood by one skilled in the art. As a non-limiting example, the memory 184 may be any suitable type of storage medium that may be accessed by the processor 186 so as to be capable of performing the various controlling functions of the humidifier 10 and of the one or more auxiliary humidifiers 10', as will be further discussed later in more detail. In this regard, the memory 184 may be a non-transitory computer readable medium having computer readable instructions (e.g., computer program instructions) stored thereon that are executable by the processor 186 so as to be capable of performing the various controlling functions of the humidifier 10 and of the one or more auxiliary humidifiers 10'. Moreover, as a non-limiting example, the memory 184 may be volatile or nonvolatile memory, and may be removable (e.g., portable) memory or non-removable (e.g., internal) memory, as may be understood by one skilled in the art.

Figure 2A:
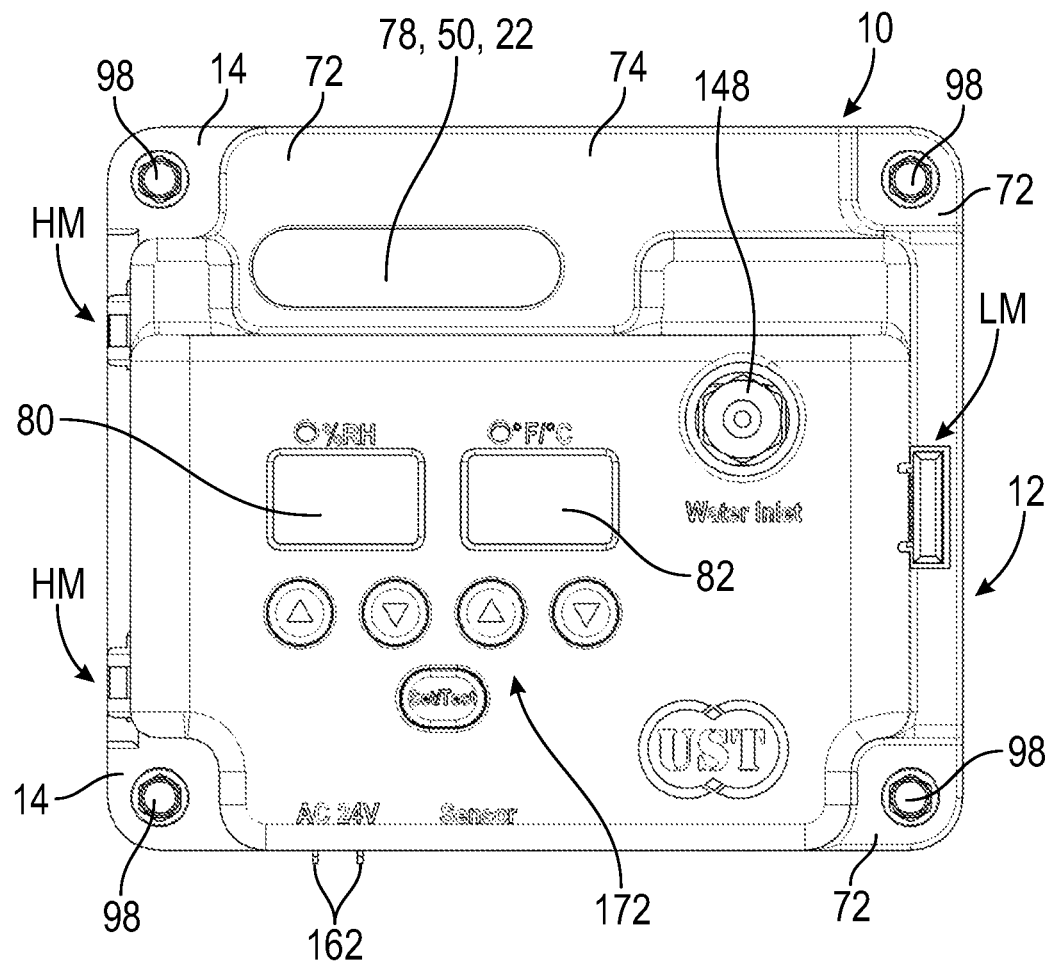
FIG. 2A is a front view of the humidifier shown in FIGS. 1A and 1B, showing the humidifier with mounting fasteners installed on the humidifier.
Figure 2D:
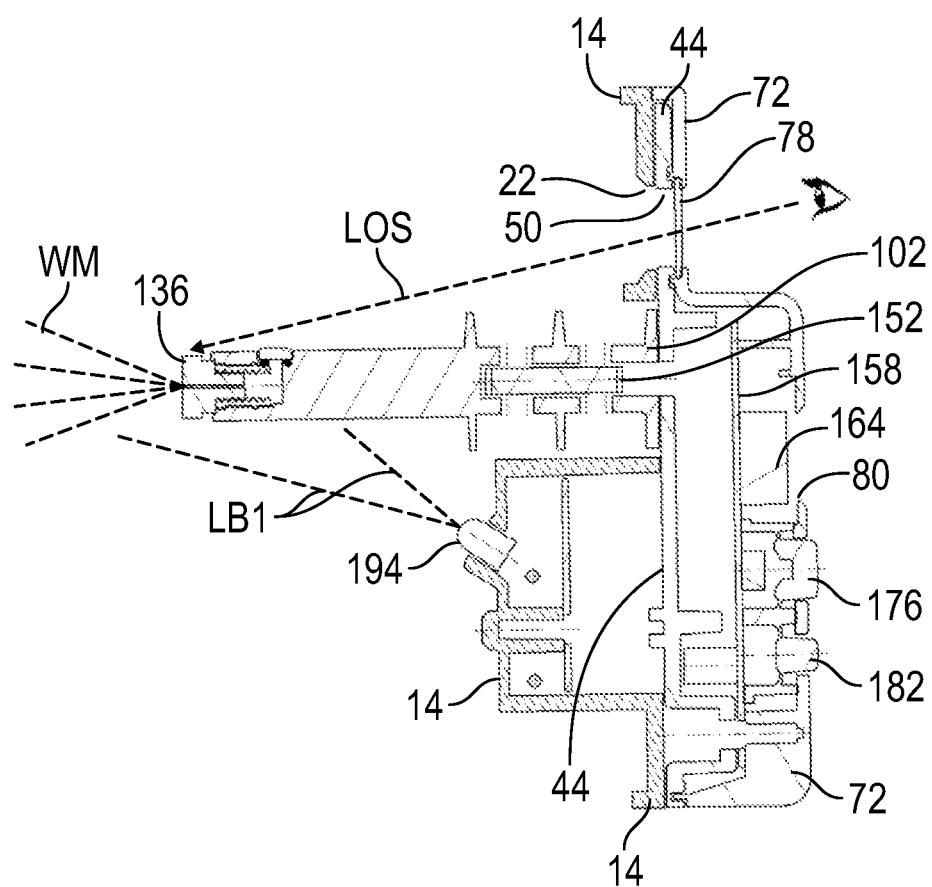
FIG. 2D is a sectional view of the humidifier taken along line A-A shown in FIG. 2C.
Figure 3:
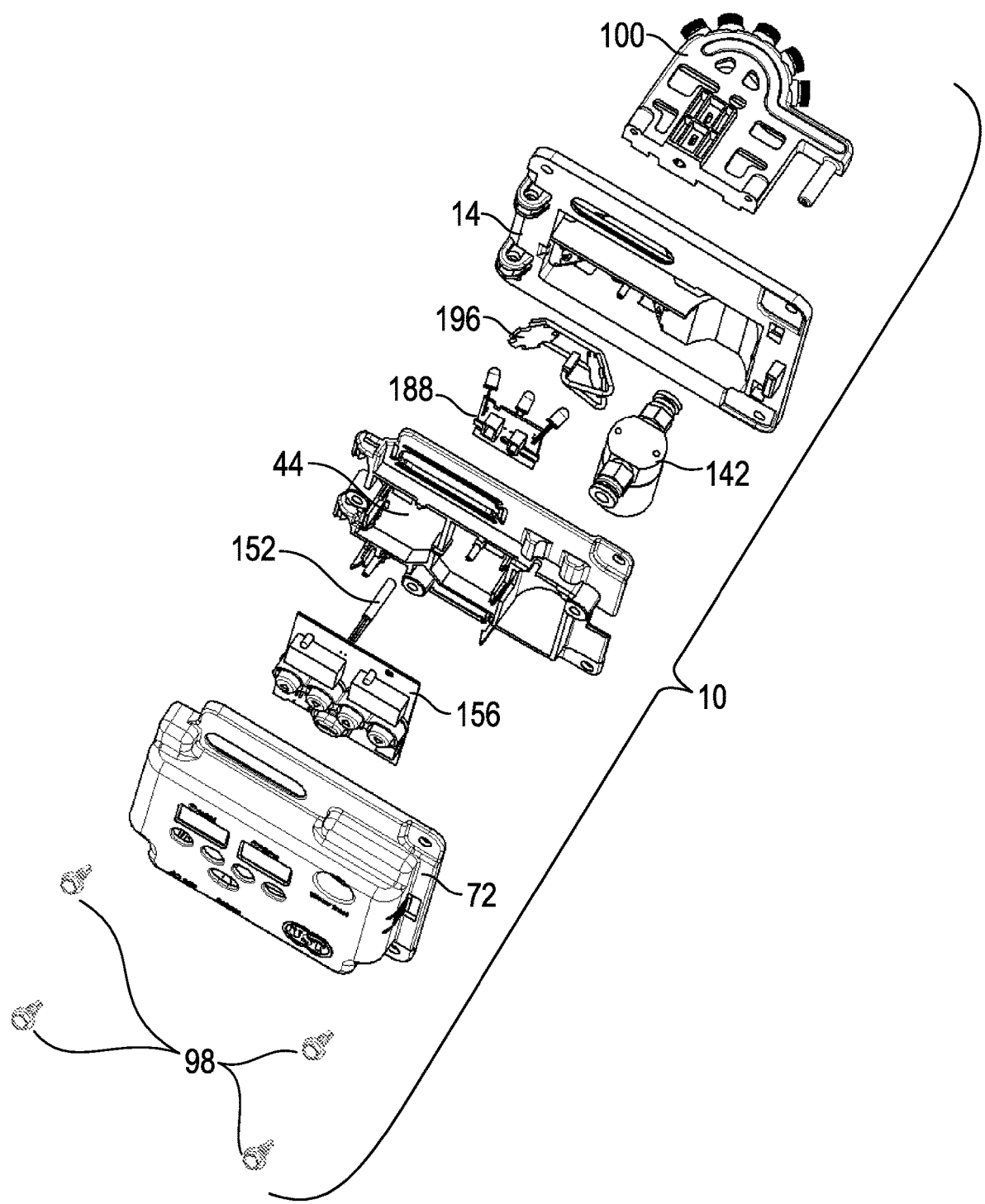
FIG. 3 is an exploded front, top perspective view of the humidifier shown in at least FIGS. 2A-2D.
Figure 4A:
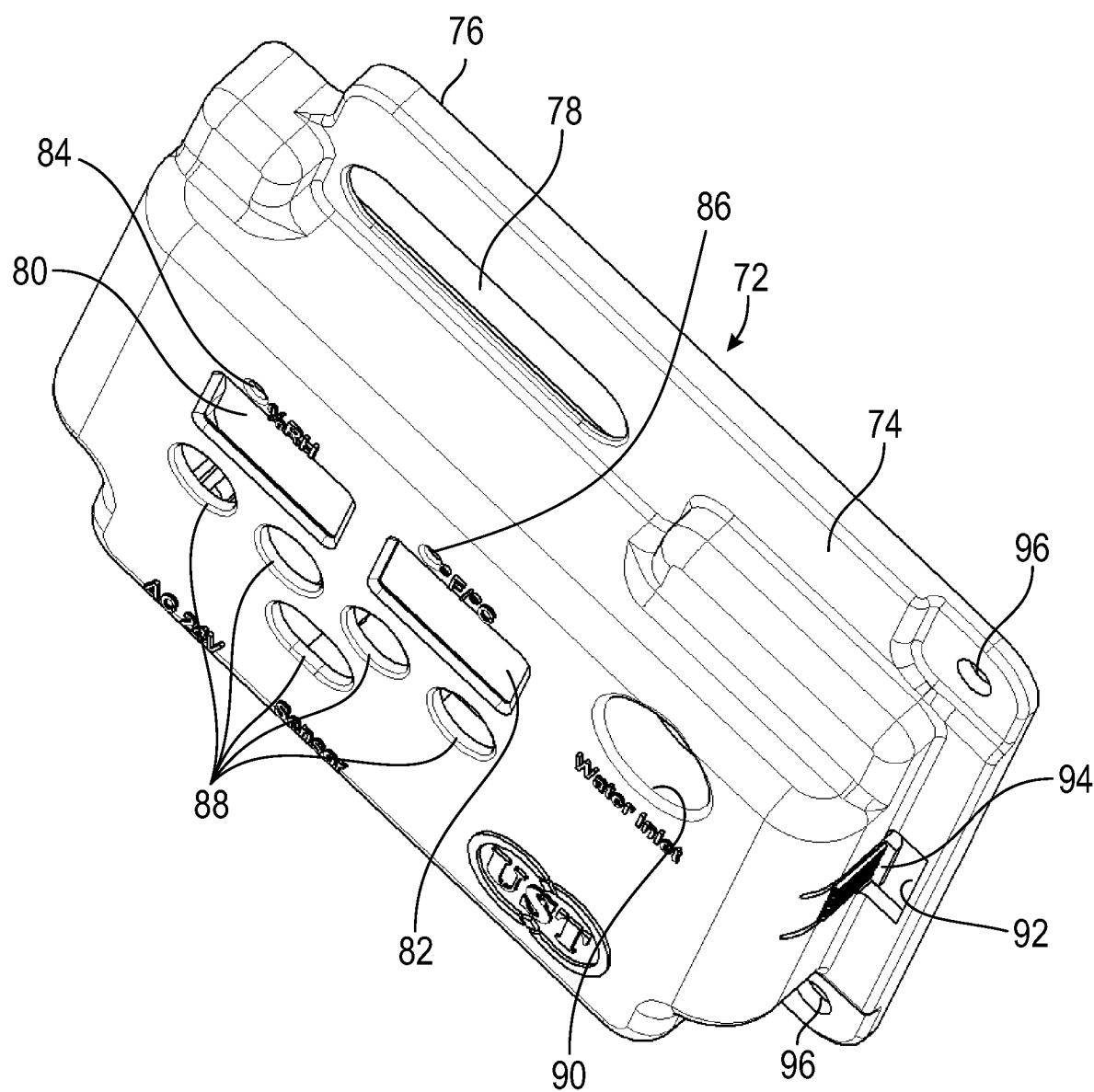
FIG. 4A is a front, top perspective view of a cover of a housing assembly of the humidifier shown in at least FIG. 3.
Figure 4B:
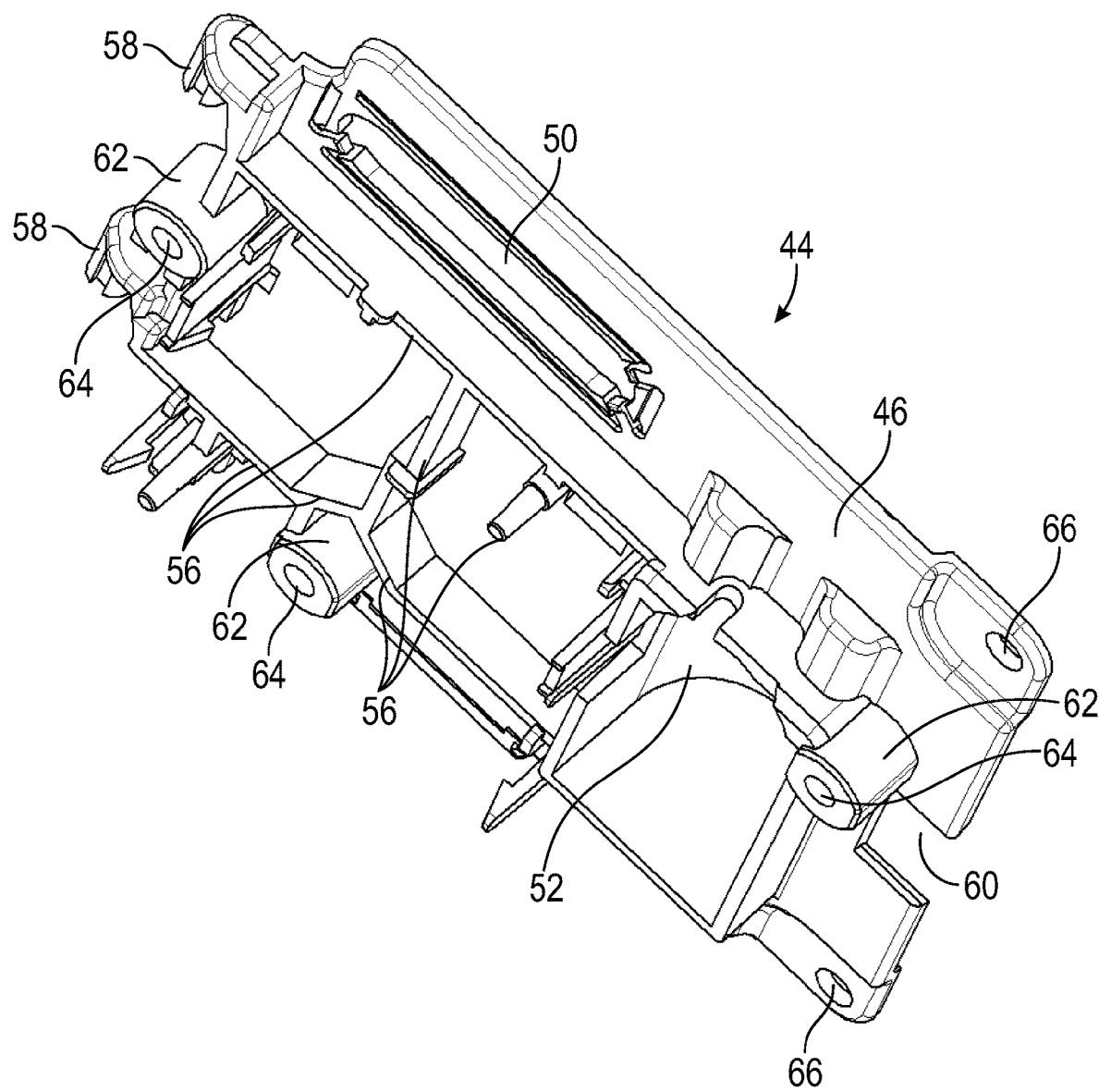
FIG. 4B is a front, top perspective view of a panel of the housing assembly of the humidifier shown in at least FIG. 3.
Figure 7:
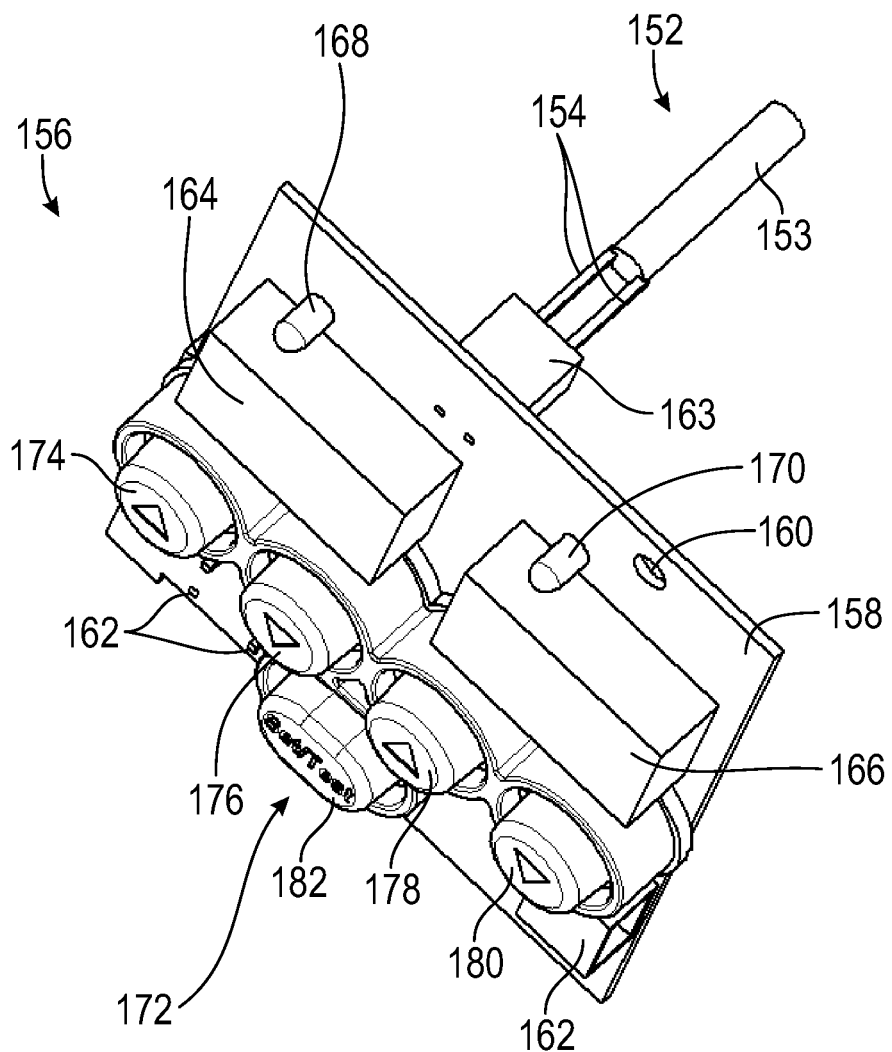
FIG. 7 is a front, top perspective view of an air temperature sensor and a control printed circuit board assembly (PCBA) of the humidifier shown in at least FIG. 3.
Figure 8:
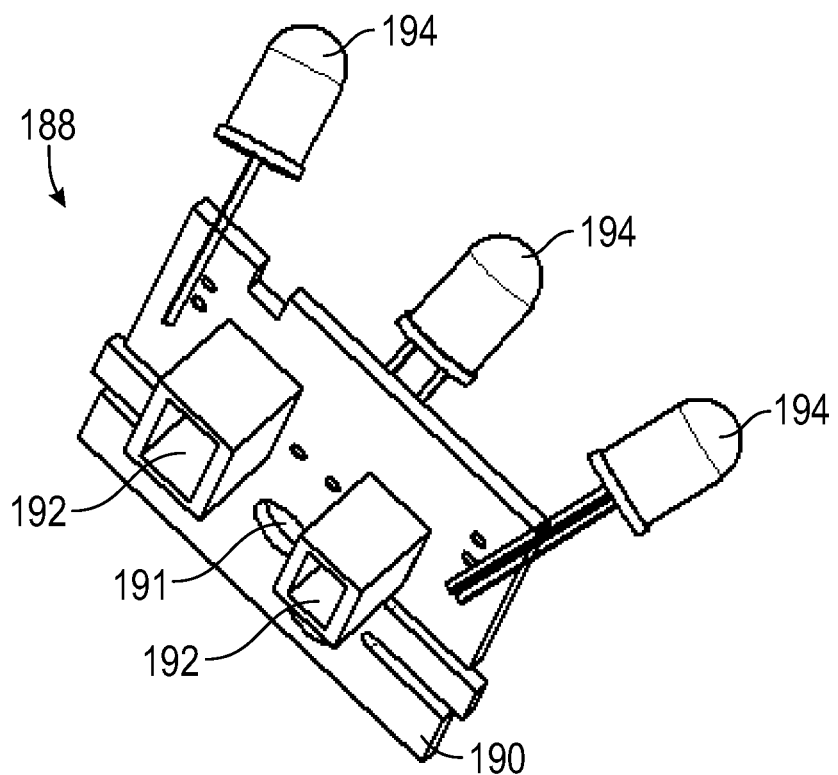
FIG. 8 is a front, top perspective view of a spray nozzle lighting unit of the humidifier shown in at least FIG. 3.
Figure 9A:
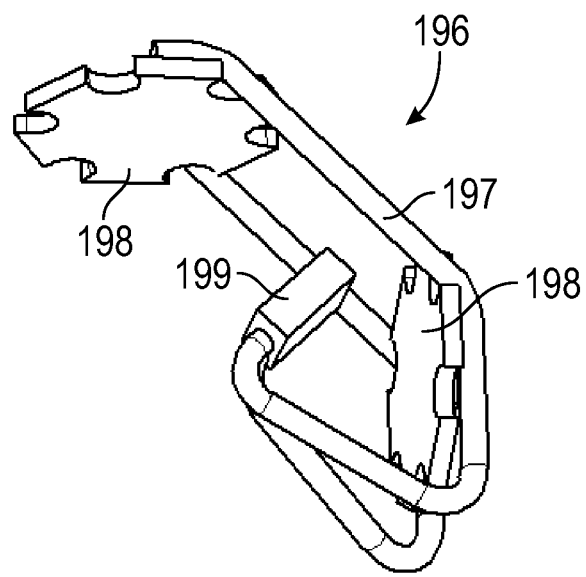
FIG. 9A is a front, top perspective view of a sterilization lighting unit of the humidifier shown in at least FIG. 3.
Figure 9B:
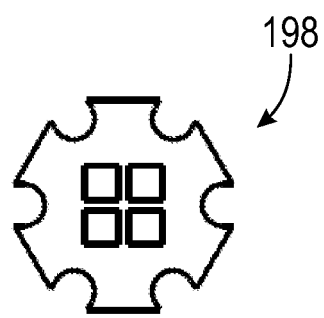
FIG. 9B is a rear view of a portion of the sterilization lighting unit shown in at least FIG. 9A, showing at least one light source of the sterilization lighting unit.

As shown particularly in FIGS. 3, 4B and 7, the control printed circuit board assembly (PCBA) 156 may be seated at least partially within and/or against the control printed circuit board assembly (PCBA) support portion 56 of the panel 44 of the housing assembly 12. At least one fastener (not shown) may be inserted through the at least one fastener-receiving hole 160 formed in the printed circuit board (PCB) 158 of the control printed circuit board assembly (PCBA) 156 and secured into the printed circuit board assembly (PCBA) support portion 56 of the panel 44 so as to attach the control printed circuit board assembly (PCBA) 156 to the panel 44. In this regard, the control printed circuit board assembly (PCBA) 156 may therefore be carried by the panel 44 of the housing assembly 12. As shown particularly in FIGS. 1A, 2A, 2C, 2D, 3 and 13, the control printed circuit board assembly (PCBA) 156 may be disposed between the panel 44 and the cover 72 of the housing assembly 12. More specifically, with the cover 72 attached to the panel 44 of the housing assembly 12, the first LED display 164, the second LED display 166, the first LED indicator light source 168 and the second LED indicator light source 170 of the control printed circuit board assembly (PCBA) 156 may substantially align with, and may be exposed or viewable through, the first display window 80, the second display window 82, the first LED indicator light source opening 84 and the second LED indicator light source opening 86 of the cover 72, respectively. Moreover, with the cover 72 attached to the panel 44 of the housing assembly 12, the user interface 172 of the control printed circuit board assembly (PCBA) 156 may protrude forwardly and at least partially through the plurality of user interface openings 88 formed in the cover 72 so as to be easily engageable (i.e., pressable) by the user.

Figure 2B:
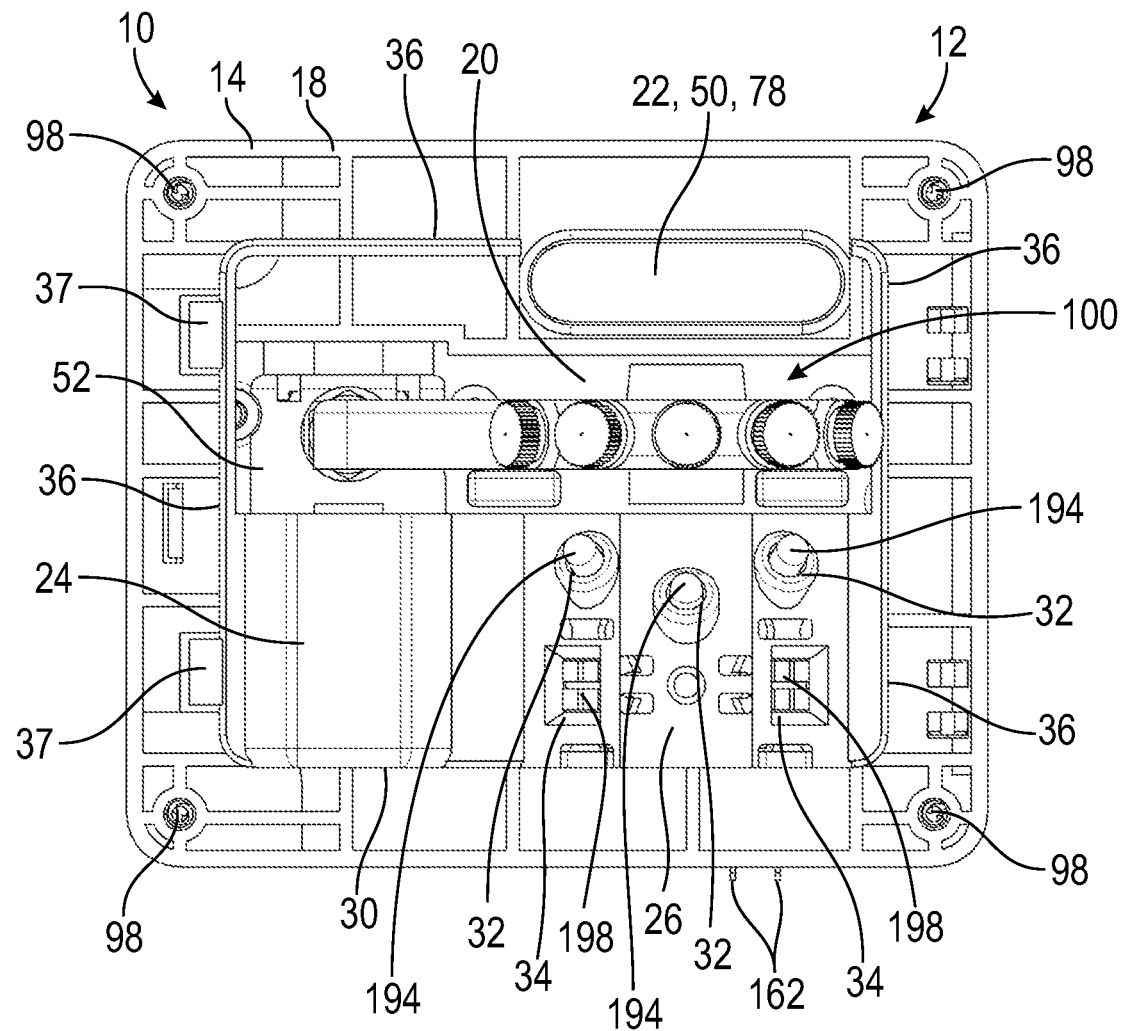
FIG. 2B is a rear view of the humidifier shown in at least FIG. 2A.
Figure 2C:
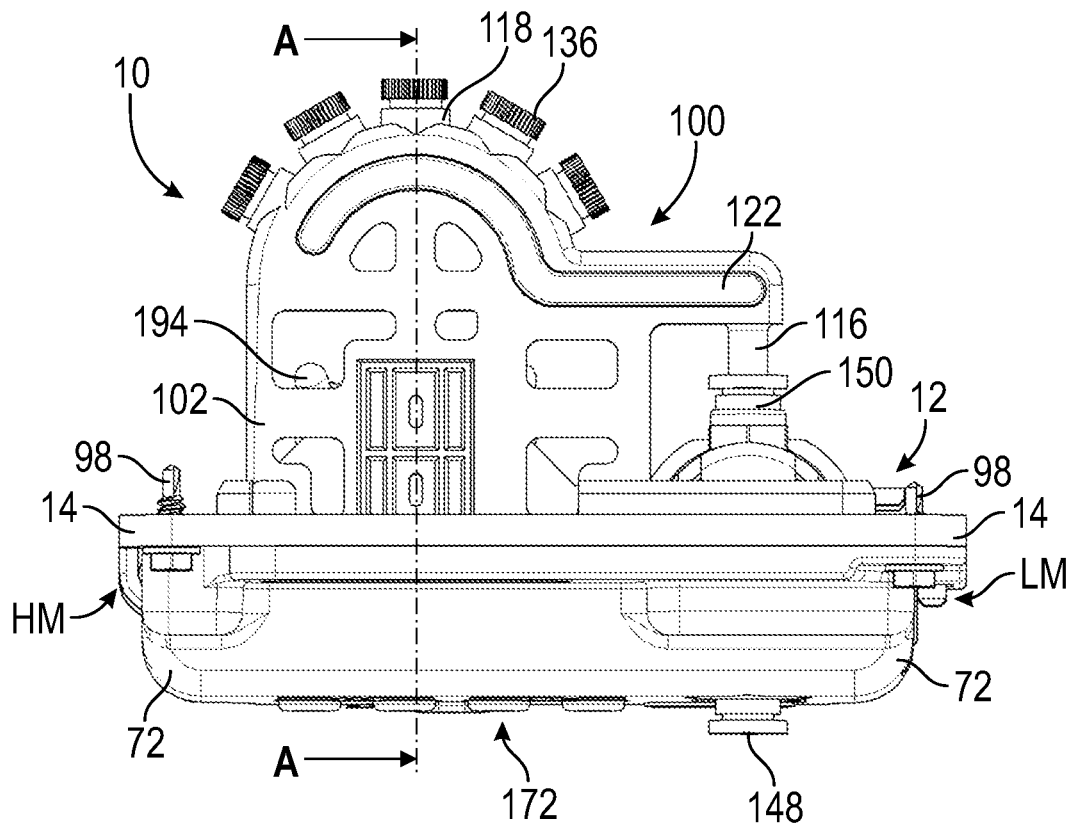
FIG. 2C is a top plan view of the humidifier shown in at least FIGS. 2A and 2B.
Figure 11:
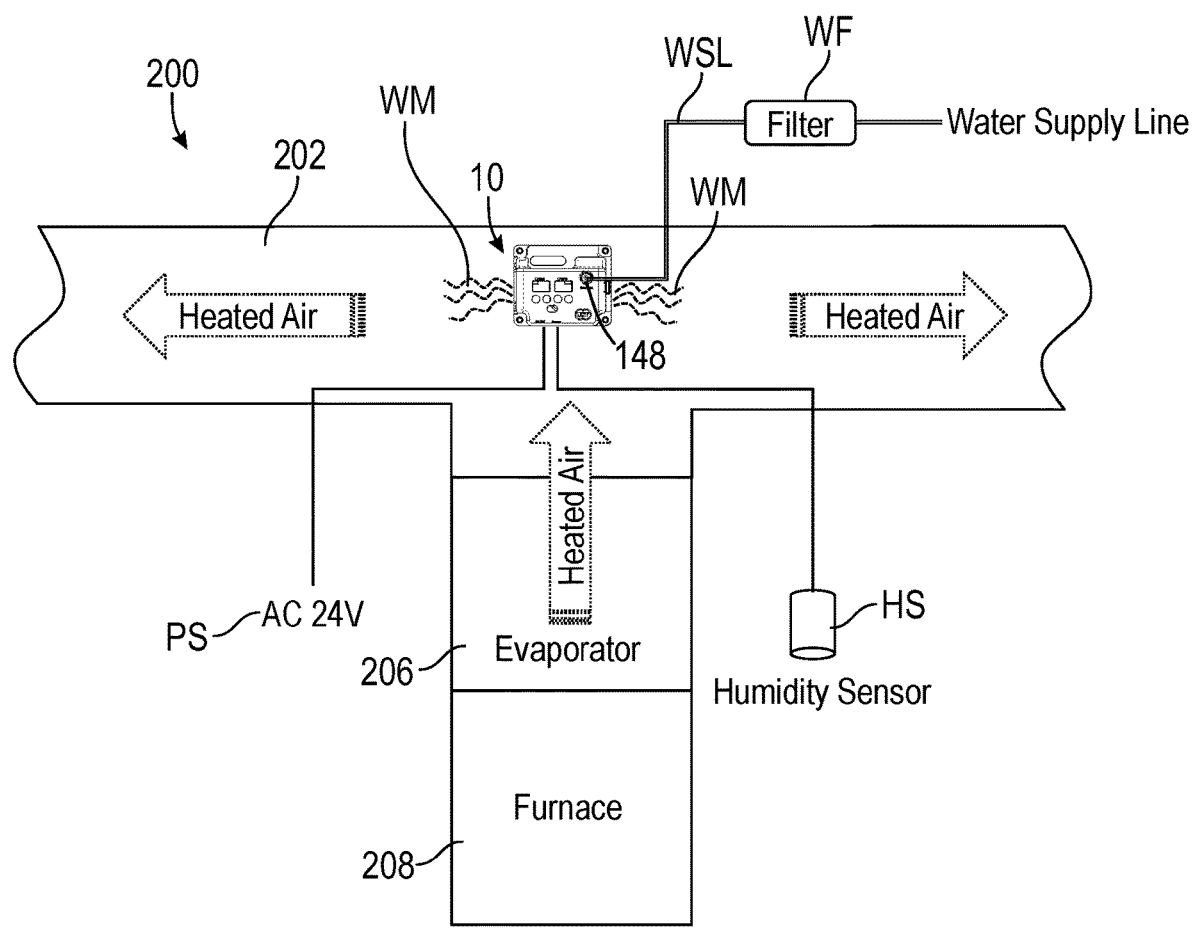
FIG. 11 is a schematic diagram schematically showing the forced-air heating system employing the humidifier.
Figure 16:
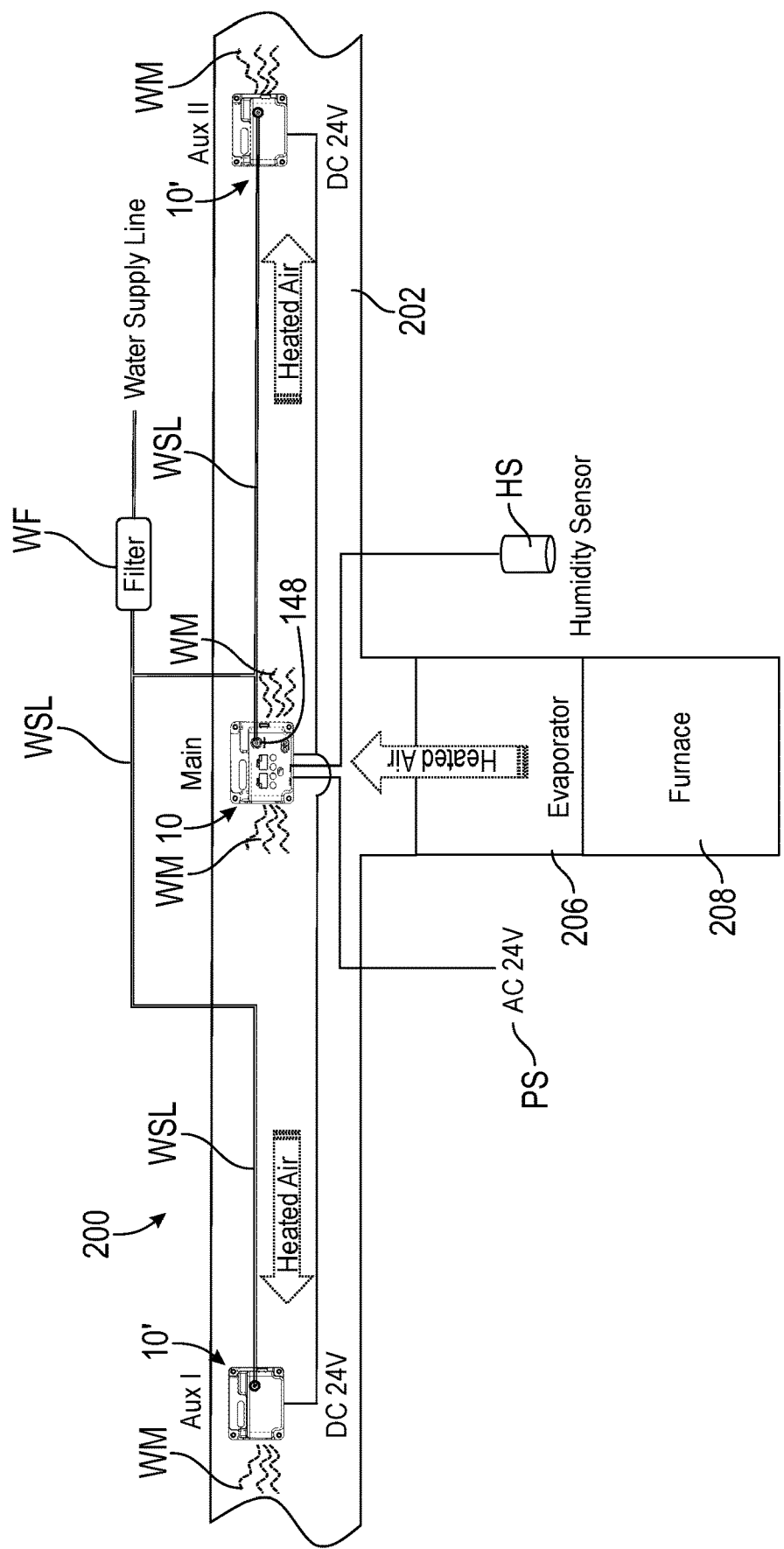
FIG. 16 is a schematic diagram schematically showing the forced-air heating system employing the humidifier and a plurality of auxiliary humidifiers, and further schematically showing the humidifier being in further electrical communication with the plurality of auxiliary humidifiers.

As shown particularly in FIGS. 2A and 2B and schematically shown in FIGS. 11 and 16, the humidifier 10 may be electrically powered by way of the control printed circuit board assembly (PCBA) 156 receiving electrical power from an electrical power source PS, such as an AC 24V electrical power supply PS, provided in a home or other building. In this regard, at least one electrical wire or cable (not shown) may be connected to the electrical power source PS and to at least one of the plurality of electrical connectors 162 of the control printed circuit board assembly (PCBA) 156, as may be understood by one skilled in the art.

As previously discussed herein, the air temperature sensor 152 may be operably connected to the control printed circuit board assembly (PCBA) 156 of the humidifier 10 so as to be in communication with the control printed circuit board assembly (PCBA) 156. In this regard, as shown particularly in FIG. 7 and schematically shown in FIGS. 11, 12 and 16, the one or more connecting posts or wires 154 of the air temperature sensor 152 may be connected to the air temperature sensor connector 163 of the control printed circuit board assembly (PCBA) 156. Similarly, as schematically shown in FIGS. 11, 12 and 16, a humidity sensor HS may be operably connected to the humidity sensor connector (not shown) of the control printed circuit board assembly (PCBA) 156, such as by way of at least one electrical wire or cable (not shown), such that the humidity sensor HS is in communication with the control printed circuit board assembly (PCBA) 156, as will be further discussed later in more detail. As a non-limiting example, the humidity sensor HS may be any suitable high-precision humidity sensor, such as a resistance humidity sensor, that is capable of sufficiently sensing a relative humidity level of air.

Moreover, as previously discussed herein, the electronically controlled solenoid (not shown) disposed internally within the electronically controlled solenoid valve assembly 146 of the electronically controlled water supply valve 142 may be controlled (i.e., actuated) by way of electrical power (i.e., electrical current) supplied thereto such that the electronically controlled water supply valve 142 regulates or otherwise controls (e.g., starts, stops, increases, decreases, etc.) a flow of water supplied to the water inlet 116 of the water mist spraying unit 100 of the humidifier 10. In this regard, the electronically controlled water supply valve 142 may be controlled by the control printed circuit board assembly (PCBA) 156, by way of receiving electrical power (i.e., electrical current) from the control printed circuit board assembly (PCBA) 156, such as by way of at least one electrical wire or cable (not shown) being connected to at least one of the plurality of electrical connectors 162 of the control printed circuit board assembly (PCBA) 156 and to the electronically controlled solenoid valve assembly 146 of the electronically controlled water supply valve 142, as may be understood by one skilled in the art. Moreover, as schematically shown in FIG. 16, the control printed circuit board assembly (PCBA) 156 of the humidifier 10 may advantageously also be in electrical communication with at least one electronically controlled water supply valve (not shown) of at least one auxiliary humidifier 10', such as the one or more auxiliary humidifiers 10', which are different from (i.e., not the same as) the humidifier 10. In this regard, the at least one electronically controlled water supply valve (not shown) of the at least one auxiliary humidifier 10' may be controlled by the control printed circuit board assembly (PCBA) 156 of the humidifier 10 by way of receiving electrical power (i.e., electrical current) from the control printed circuit board assembly (PCBA) 156, in the manner as previously discussed herein, such that the at least one electronically controlled water supply valve (not shown) of the at least one auxiliary humidifier 10' regulates or otherwise controls (e.g., starts, stops, increases, decreases, etc.) a flow of water supplied to a water inlet (not shown) of a water mist spraying unit (not shown) of the at least one auxiliary humidifier 10', as may be understood by one skilled in the art.

Furthermore, the control printed circuit board assembly (PCBA) 156 of the humidifier 10 may be in electrical communication with the spray nozzle lighting unit 188 and the sterilization lighting unit 196 of the humidifier 10 so as to provide electrical power to the spray nozzle lighting unit 188 and the sterilization lighting unit 196, as will be further discussed later in more detail. Moreover, as schematically shown in FIG. 16, the control printed circuit board assembly (PCBA) 156 of the humidifier 10 may advantageously also be in electrical communication with a spray nozzle lighting unit (not shown) and a sterilization lighting unit (not shown) of the one or more auxiliary humidifiers 10' which are different from (i.e., not the same as) the humidifier 10 so as to provide electrical power to the spray nozzle lighting unit (not shown) and the sterilization lighting unit (not shown) of the one or more auxiliary humidifiers 10', as will be further discussed later in more detail.

With regard to all that has been disclosed herein concerning the control printed circuit board assembly (PCBA) 156 of the humidifier 10, it is to be appreciated that the control printed circuit board assembly (PCBA) 156 of the humidifier 10 may therefore be advantageously capable of performing the various controlling functions of not only the humidifier 10, but also of the one or more auxiliary humidifiers 10' (if optionally installed, as will be further discussed later in more detail). As non-limiting examples, the control printed circuit board assembly (PCBA) 156 of the humidifier 10 may be employed for at least (i) setting and storing a desired relative humidity level pre-set value $RHL_{PRE-SET}$ and a desired heated air temperature pre-set value $HAT_{PRE-SET}$, (ii) comparing the desired relative humidity level pre-set value $RHL_{PRE-SET}$ and the desired heated air temperature pre-set value $HAT_{PRE-SET}$ with a sensed actual relative humidity level $RHL_{ACTUAL}$ and a sensed actual heated air temperature $HAT_{ACTUAL}$, respectively (as will be further discussed later in more detail), so as to determine if water mist spray turn-on conditions (i.e., a relative humidity level water mist spray turn-on condition $RHL_{WMS\_TURN-ON}$ and a heated air temperature water mist spray turn-on condition $HAT_{WMS\_TURN-ON}$) are met, (iii) indicating when each of the relative humidity level and heated air temperature water mist spray turn-on conditions $RHL_{WMS\_TURN-ON}$, $HAT_{WMS\_TuRN-ON}$ are met such that the humidifier 10, and the one or more auxiliary humidifiers 10', are controlled to start spraying water mist WM, (iv) calibrating/adjusting tolerances (i.e., for correction) of the sensed actual relative humidity level $RHL_{ACTUAL}$, (v) displaying relative humidity level and heated air temperature information (i.e., the actual relative humidity level $RHL_{ACTUAL}$ and the actual heated air temperature $HAT_{ACTUAL}$), (vi) switching air temperature units between degrees Fahrenheit (° F.) and degrees Celsius (° C.), (vii) controlling the electronically controlled water supply valves (i.e., 142, not shown) of the humidifier 10 and the one or more auxiliary humidifiers 10', (viii) testing the plurality of spray nozzles (i.e., 136, not shown) of the humidifier 10 and the one or more auxiliary humidifiers 10' to verify proper operation thereof and (ix) providing electrical power to the spray nozzle lighting units (i.e., 188, not shown) and the sterilization lighting units (i.e., 196, not shown) of the humidifier 10 and the one or more auxiliary humidifiers 10', as will be further discussed later in more detail.

Referring to at least FIGS. 1B, 2B, 2D, 3, 4E, 8 and 10, the spray nozzle lighting unit 188 of the humidifier 10 will now be further described in more detail herein. As shown particularly in FIG. 8, the spray nozzle lighting unit 188 may include a printed circuit board (PCB) 190 including at least one fastener-receiving hole 191 formed therein, a plurality of electrical connectors 192 and at least one LED light source 194, such as a plurality of LED light sources 194, operably connected to the printed circuit board (PCB) 190 so as to be in electrical communication with at least the printed circuit board (PCB) 190 of the spray nozzle lighting unit 188. As shown particularly in FIGS. 2D and 8, each of the plurality of LED light sources 194 may be angled generally upwardly, as will be further discussed later in more detail. As a non-limiting example, the plurality of LED light sources 194 may be a plurality of super bright white LED light sources 194, as may be understood by one skilled in the art.

As shown particularly in FIGS. 1B, 2B, 2D, 3, 4E, 8 and 10, the spray nozzle lighting unit 188 may be disposed at the generally recessed lighting unit support portion 26 of the mounting frame 14 of the housing assembly 12 so as to be seated at least partially within and/or against the generally recessed lighting unit support portion 26. At least one fastener (not shown) may be inserted through the at least one fastener-receiving hole 191 formed in the printed circuit board (PCB) 190 of the spray nozzle lighting unit 188 and secured into the generally recessed lighting unit support portion 26 of the mounting frame 14 so as to attach the spray nozzle lighting unit 188 to the mounting frame 14 of the housing assembly 12. As shown particularly in FIG. 1B, with the spray nozzle lighting unit 188 attached to the generally recessed lighting unit support portion 26 of the mounting frame 14, the plurality of LED light sources 194 may protrude generally upwardly and rearwardly and at least partially through the respective plurality of LED light source openings 32 formed in the generally recessed lighting unit support portion 26 of the mounting frame 14 of the housing assembly 12. In this regard, as shown particularly in FIGS. 1B and 2D, when the panel 44 of the housing assembly 12 is in the closed position, the plurality of LED light sources 194 of the spray nozzle lighting unit 188 are advantageously capable of emitting light (i.e., a plurality of light beams LB1 projecting through the respective plurality of LED light source openings 32) directly towards the plurality of spray nozzles 136 of the water mist spraying unit 100, as will be further discussed later in more detail. The spray nozzle lighting unit 188 may receive electrical power from the control printed circuit board assembly (PCBA) 156, such as by way of at least one electrical wire or cable (not shown) being connected to at least one of the plurality of electrical connectors 162 of the control printed circuit board assembly (PCBA) 156 and to at least one of the plurality of electrical connectors 192 of the spray nozzle lighting unit 188, as may be understood by one skilled in the art.

Referring to at least FIGS. 1B, 2B, 3, 4E, 9A, 9B, 10 and 14, the sterilization lighting unit 196 of the humidifier 10 will now be further described in more detail herein. As shown particularly in FIGS. 9A and 9B, the sterilization lighting unit 196 may include a main body 197 (e.g., which may be generally wirelike), at least one UV-C (ultraviolet-C) light source 198, such as a plurality of UV-C light sources 198, electrically connected to the main body 197 and an electrical connector 199. As shown particularly in FIGS. 9A and 14, each of the plurality of UV-C light sources 198 of the sterilization lighting unit 196 may be angled with respect to one another (e.g., so as to be substantially perpendicular with respect to one another) such that an angle α3 is defined between each of the plurality of UV-C light sources 198. As a non-limiting example, the angle α3 is preferably 90° or about 90°, as will be further discussed later in more detail. As shown particularly in FIGS. 9A and 9B, as a non-limiting example, each of the plurality of UV-C light sources 198 of the sterilization lighting unit 196 may be a star printed circuit board (PCB) including a group of UV-C LED light sources disposed thereon. Moreover, as a non-limiting example, each of the plurality of UV-C light sources 198 of the sterilization lighting unit 196 may emit light (i.e., sanitizing light), such as 275 nm UV-C photons that are capable of breaking down the DNA (and RNA) of bacteria, viruses, fungi and mold spores, thereby rendering them inactive and harmless. In this regard, the use of UV-C light may therefore sanitize air, water mist and various surrounding components and/or surfaces of the humidifier 10 and the forced-air heating system 200 without the use of harmful chemicals, as will be further discussed later in more detail.

As shown particularly in FIGS. 1B, 2B, 3, 4E, 9A, 10 and 14, like the spray nozzle lighting unit 188, the sterilization lighting unit 196 may also be disposed at the generally recessed lighting unit support portion 26 of the mounting frame 14 of the housing assembly 12 so as to be seated at least partially within and/or against the generally recessed lighting unit support portion 26. As shown particularly in FIGS. 1B, 2B and 10, a majority of the sterilization lighting unit 196 may be disposed rearwardly of the printed circuit board (PCB) 190 of the spray nozzle lighting unit 188 and the plurality of UV-C light sources 198 of the sterilization lighting unit 196 may be substantially aligned with the respective plurality of UV-C light source openings 34 formed in the generally recessed lighting unit support portion 26 of the mounting frame 14 of the housing assembly 12. In this regard, as shown particularly in FIG. 14, the plurality of UV-C light sources 198 of the sterilization lighting unit 196 are advantageously capable of emitting light (i.e., a plurality of wide-angle UV-C light beams LB2 projecting through the respective plurality of UV-C light source openings 34) into an interior of the component 202, such as the air duct or the supply plenum, of the forced-air heating system 200, as will be further discussed later in more detail. As shown particularly in FIG. 14, since each of the plurality of UV-C light sources 198 of the sterilization lighting unit 196 may be angled with respect to one another (e.g., so as to be substantially perpendicular with respect to one another), as previously discussed herein, each of the plurality of wide-angle UV-C light beams LB2 are advantageously capable of covering or spanning an area defined by a relatively wide angle α4, which is preferably 120° or about 120°. In this regard, the plurality of wide-angle UV-C light beams LB2 emitted by the respective plurality of UV-C light sources 198 of the sterilization lighting unit 196 are together advantageously capable of covering or spanning substantially the entire area (i.e., proximate the humidifier 10) disposed within the interior of the component 202 of the forced-air heating system 200, as will be further discussed later in more detail. As shown particularly in FIGS. 8, 9A and 10, the electrical connector 199 of the sterilization lighting unit 196 may be electrically connected to one of the plurality of electrical connectors 192 of the spray nozzle lighting unit 188 such that the sterilization lighting unit 196 may receive electrical power from the control printed circuit board assembly (PCBA) 156 by way of the electrical connection with the spray nozzle lighting unit 188, as may be understood by one skilled in the art.

Referring to at least FIGS. 10, 11, 14 and 16, the overall installation of the humidifier 10 will now be further described in more detail herein. As shown particularly in FIG. 10 and schematically shown in FIGS. 11, 14 and 16, the humidifier 10 may be installed in a home or other building and may be mounted on the forced-air heating system 200 so as to be useable therewith. More specifically, as previously discussed herein, the mounting frame 14 of the housing assembly 12 of the humidifier 10 may be attached (e.g., by way of the plurality of mounting fasteners 98 of the housing assembly 12) to the component 202, such as the air duct or the supply plenum (e.g., which may be disposed above an evaporator (coil) 206 of a furnace 208 of the forced-air heating system 200), at or near the cutout 204 formed in the component 202 of the forced-air heating system 200. It is to be appreciated that since the overall design of the humidifier 10 is relatively compact, the cutout 204 (e.g., which may be a rectangular opening cut out of a sheet metal wall portion of the component 202) formed in the component 202 of the forced-air heating system 200 may advantageously be relatively small in size. As also previously discussed herein, the one or more ribs or wall portions 36 of the mounting frame 14 of the housing assembly 12, together with the securing tabs 37 and the generally horizontal lower rib or wall portion 30 of the mounting frame 14, may be arranged proximate to, or seated against, edges of the cutout 204 formed in the component 202 of the forced-air heating system 200 when the mounting frame 14 is attached to the component 202. As shown particularly in FIG. 10, the mounting frame 14 of the housing assembly 12 may be attached to the component 202 of the forced-air heating system 200 with two of the plurality of mounting fasteners 98 being inserted through two of the fastener-receiving holes 42 formed in the mounting frame 14 and secured into the component 202. With the mounting frame 14 of the housing assembly 12 attached to the component 202 of the forced-air heating system 200, the panel 44 of the housing assembly 12 may be quickly and easily pivotally coupled to the mounting frame 14 of the housing assembly 12, by way of the hinge mechanism HM of the housing assembly 12, such that the panel 44 is in the open position with respect to the mounting frame 14. As shown particularly in FIGS. 11 and 16, the panel 44 of the housing assembly 12 may then be moved into the closed position (i.e., with the latch mechanism LM of the housing assembly 12 engaged) and the remaining two of the plurality of mounting fasteners 98 may be inserted through the fastener-receiving holes 96, 66, 42 of the respective cover 72, panel 44 and mounting frame 14 of the housing assembly 12 and secured into the component 202 of the forced-air heating system 200 so as to completely and tightly mount the humidifier 10 on the forced-air heating system 200.

As schematically shown in FIGS. 11 and 16, the humidifier 10 may be mounted on the forced-air heating system 200, such as in the manner as previously discussed herein. Moreover, as schematically shown in FIG. 16, the one or more auxiliary humidifiers 10' may be mounted on the forced-air heating system 200 at various other locations, such as in substantially the same manner as previously discussed herein regarding the humidifier 10, as may be understood by one skilled in the art. It is to be understood that employing the one or more auxiliary humidifiers 10' on the forced-air heating system 200 is optional, but may be desirable in certain situations, for reasons that will be further discussed later in more detail. The one or more auxiliary humidifiers 10' may be substantially the same as the humidifier 10, but devoid of at least the air temperature sensor 152 and the control printed circuit board assembly (PCBA) 156, and therefore further devoid of at least the first and second LED displays 164, 166, the first and second LED indicator light sources 168, 170, the user interface 172, the memory 184, the processor 186, etc. In this regard, the one or more auxiliary humidifiers 10' are therefore different than the humidifier 10.

As further schematically shown in FIGS. 11 and 16, the electrical power source PS, such as the AC 24V electrical power supply PS, may be electrically connected to the humidifier 10, such as in the manner as previously discussed herein, so as to provide electrical power to the humidifier 10. Moreover, as schematically shown in FIG. 16, the humidifier 10 may be in further electrical communication with the one or more auxiliary humidifiers 10' (e.g., by way of at least one electrical wire or cable) so as to provide electrical power to the one or more auxiliary humidifiers 10'. As a non-limiting example, the humidifier 10 (i.e., the control printed circuit board assembly (PCBA) 156) may serve as a DC 24V power supply so as to provide electrical power to the one or more auxiliary humidifiers 10' (e.g., to a printed circuit board (PCB) (not shown) disposed within the one or more auxiliary humidifiers 10' for distributing/directing electrical power to the electronically controlled water supply valve (not shown), the spray nozzle lighting unit (not shown) and the sterilization lighting unit (not shown) of the one or more auxiliary humidifiers 10'). In this regard, as previously discussed herein, the control printed circuit board assembly (PCBA) 156 of the humidifier 10 may advantageously be in electrical communication with at least the electronically controlled water supply valve (not shown), the spray nozzle lighting unit (not shown) and the sterilization lighting unit (not shown) of the one or more auxiliary humidifiers 10' so as to provide electrical power to the electronically controlled water supply valve (not shown), the spray nozzle lighting unit (not shown) and the sterilization lighting unit (not shown) of the one or more auxiliary humidifiers 10'. Furthermore, in this regard, the control printed circuit board assembly (PCBA) 156 of the humidifier 10 may advantageously control the electronically controlled water supply valve (not shown) of the one or more auxiliary humidifiers 10', such as in the manner as previously discussed herein.

As further schematically shown in FIGS. 11, 12 and 16, the humidity sensor HS may be operably connected to the humidifier 10, such as in the manner as previously discussed herein, so as to be in communication with the humidifier 10 (i.e., the control printed circuit board assembly (PCBA) 156). The humidity sensor HS may be mounted or otherwise provided in a living space (e.g., a room in a home or other building) or in a return air plenum (not shown) of the forced-air heating system 200, as may be understood by one skilled in the art.

As further schematically shown in FIGS. 11 and 16, a water supply line WSL (e.g., a flexible PVC or braided stainless steel water supply line in fluid communication with a water supply source provided in a home or other building) may be operably coupled to the main water inlet 148 of the humidifier 10 so as to be in fluid communication with the humidifier 10 (i.e., the electronically controlled water supply valve 142 and therefore the water mist spraying unit 100). Moreover, as schematically shown in FIG. 16, the water supply line WSL may be operably coupled to the main water inlet 148 of the humidifier 10 and a main water inlet (unnumbered) of the one or more auxiliary humidifiers 10' so as to be in fluid communication with the humidifier 10 and the one or more auxiliary humidifiers 10' (i.e., the electronically controlled water supply valve 142, (not shown) and therefore the water mist spraying unit 100, (not shown)). In either configuration, as schematically shown in FIGS. 11 and 16, the water supply line WSL may include an in-line filter WF so as to advantageously eliminate particles in the water flowing through the water supply line WSL and prevent potential scale buildup, as may be understood by one skilled in the art.

Referring to FIGS. 1A-16, the overall operation of the humidifier 10 will now be further described in more detail herein. As schematically shown in FIGS. 11 and 16, with the panel 44 of the housing assembly 12 of the humidifier 10 in the closed position, the humidifier 10 and the one or more auxiliary humidifiers 10' (if optionally installed) may be ready for use with the forced-air heating system 200. Moreover, as collectively shown in FIGS. 1B, 2C, 2D, 10, 11, 14 and 16, with the panel 44 of the housing assembly 12 of the humidifier 10 in the closed position, the water mist spraying unit 100 may extend through the main opening 20 formed in the mounting frame 14 of the housing assembly 12 and into the interior of the component 202 of the forced-air heating system 200 such that at least a substantial majority of the water mist spraying unit 100 is disposed within the interior of the component 202, thereby being positioned to spray water mist WM into the interior of the component 202 of the forced-air heating system 200. In this regard, the closed position of the panel 44 of the housing assembly 12 and the resulting positioning of the water mist spraying unit 100 of the humidifier 10, as just described herein, may also apply to the one or more auxiliary humidifiers 10' (if optionally installed).

As schematically shown in FIGS. 11 and 16, when the forced-air heating system 200 operates to generate heated air that is circulated (e.g., by a blower (not shown) of the forced-air heating system 200) to flow throughout the home or other building so as to heat the home or other building, the humidifier 10, and therefore the one or more auxiliary humidifiers 10' (if optionally installed), may receive electrical power from the electrical power source PS so as to power on automatically. In this regard, the electrical power source PS may provide electrical power to the humidifier 10, and therefore to the one or more auxiliary humidifiers 10' (if optionally installed), once the forced-air heating system 200 (e.g., such as the blower of the forced-air heating system 200) is actually in operation. As shown particularly in FIG. 13, the user may engage (i.e., press) the Set/Test button 182, and subsequently the first up (i.e., increase) adjustment button 174 or the first down (i.e., decrease) adjustment button 176 of the user interface 172, so as to set a desired relative humidity level pre-set value $RHL_{PRE\text{-}SET}$, which may be displayed on the first LED display 164 (e.g., for a time of approximately 5-10 seconds once set). As a non-limiting example, the desired relative humidity level pre-set value $RHL_{PRE\text{-}SET}$ may be set at 39.0 (i.e., 39.0% relative humidity level), or any other value that is reasonably achievable. Similarly, as shown particularly in FIG. 13, the user may engage (i.e., press) the Set/Test button 182, and subsequently the second up (i.e., increase) adjustment button 178 or the second down (i.e., decrease) adjustment button 180 of the user interface 172, so as to set a desired heated air temperature pre-set value $HAT_{PRE\text{-}SET}$, which may be displayed on the second LED display 166 (e.g., for a time of approximately 5-10 seconds once set). As a non-limiting example, the desired heated air temperature pre-set value $HAT_{PRE\text{-}SET}$ may be set at 111 (i.e., 111° F.), or any other value that is reasonably achievable. Moreover, as shown particularly in FIG. 13, the user may engage (i.e., press) the Set/Test button 182 of the user interface 172 to advantageously manually test the plurality of spray nozzles 136 of the water mist spraying unit 100 of the humidifier 10 and the plurality of spray nozzles (not shown) of the water mist spraying unit (not shown) of the one or more auxiliary humidifiers 10' (if optionally installed) to verify proper operation (i.e., proper spraying of the water mist WM) thereof.

With further regard to the user setting the desired heated air temperature pre-set value $HAT_{PRE\text{-}SET}$, an appropriate desired heated air temperature pre-set value $HAT_{PRE\text{-}SET}$ (i.e., that may be reasonably achieved by the forced-air heating system 200) may generally depend on factors such as, but not limited to, the size and type of furnace 208 that is employed in the forced-air heating system 200. For example, a smaller BTU (British Thermo Unit) furnace will typically output relatively less heat (i.e., resulting in a heated air flow having a relatively lower temperature), as compared to a larger BTU furnace that will typically output relatively more heat (i.e., resulting in a heated air flow having a relatively higher temperature). Moreover, a two-stage furnace will typically output relatively less heat (i.e., resulting in a heated air flow having a relatively lower temperature), as compared to a one-stage furnace that will typically output relatively more heat (i.e., resulting in a heated air flow having a relatively higher temperature). In this regard, as the temperature of the heated air that flows through the interior of the component 202 of the forced-air heating system 200 increases (i.e., so as to become relatively higher), water mist WM that is sprayed from the water mist spraying unit 100 of the humidifier 10 into the heated air that flows through the interior of the component 202 of the forced-air heating system 200 may advantageously evaporate more efficiently into the heated air that flows through the interior of the component 202 of the forced-air heating system 200. However, as the temperature of the heated air that flows through the interior of the component 202 of the forced-air heating system 200 decreases (i.e., so as to become relatively lower), water mist WM that is sprayed from the water mist spraying unit 100 of the humidifier 10 into the heated air that flows through the interior of the component 202 of the forced-air heating system 200 may evaporate less efficiently into the heated air that flows through the interior of the component 202 of the forced-air heating system 200. In this regard, when water mist WM is evaporated less efficiently, excessive water mist WM may settle on a surface within the interior of the component 202 of the forced-air heating system 200 or on other components (e.g., the evaporator (coil) 206 of the furnace 208) of the forced-air heating system 200, which may unfortunately result in excessive water waste or even damage to the forced-air heating system 200. Therefore, in this regard, depending on the factors such as, but not limited to, the size and type of furnace 208 employed in the forced-air heating system 200, as previously discussed herein, if the heated air that flows through the interior of the component 202 of the forced-air heating system 200 is not able to be heated so as to reach a sufficiently high temperature so as to efficiently evaporate the sprayed water mist WM, the plurality of spray nozzles 136 of the water mist spraying unit 100 may be reduced to any of the level-I, level-II or level-III reduced water mist spray configurations (i.e., as schematically shown in FIGS. 15B-15D, as previously discussed herein) thereby reducing a total amount of water mist WM that is able to be sprayed from the water mist spraying unit 100 while increasing the efficiency of the water mist WM evaporation into the heated air that flows through the interior of the component 202 of the forced-air heating system 200. Furthermore, in this regard, as schematically shown in FIG. 16, in certain situations it may be desirable to employ the one or more auxiliary humidifiers 10' on the forced-air heating system 200, such as by mounting the one or more auxiliary humidifiers 10' on the forced-air heating system 200 at various locations downstream with respect to the humidifier 10. For example, when a larger sized home or other building employs a two-stage furnace in the forced-air heating system 200 (i.e., typically outputting relatively less heat and resulting in a heated air flow having a relatively lower temperature, as previously discussed herein) yet still needs a relatively large amount of moisture to be distributed to sufficiently raise the relative humidity level of the air within the home or other building, the one or more auxiliary humidifiers 10' may be employed to provide the additional water mist WM (i.e., moisture) to sufficiently raise the relative humidity level of the air within the home or other building. In this regard, if the plurality of spray nozzles (not shown) of the water mist spraying unit (not shown) of the one or more auxiliary humidifiers 10' are reduced to any of the level-I, level-II or level-III reduced water mist spray configurations (i.e., as schematically shown in FIGS. 15B-15D, as previously discussed herein), the total number of spray nozzles (not shown) that are removably attached to the water mist spraying unit (not shown) of each of the one or more auxiliary humidifiers 10' is preferably less than or equal to (<) the total number of spray nozzles 136 that are removably attached to the water mist spraying unit 100 of the humidifier 10, as may be understood by one skilled in the art.

Figure 13:
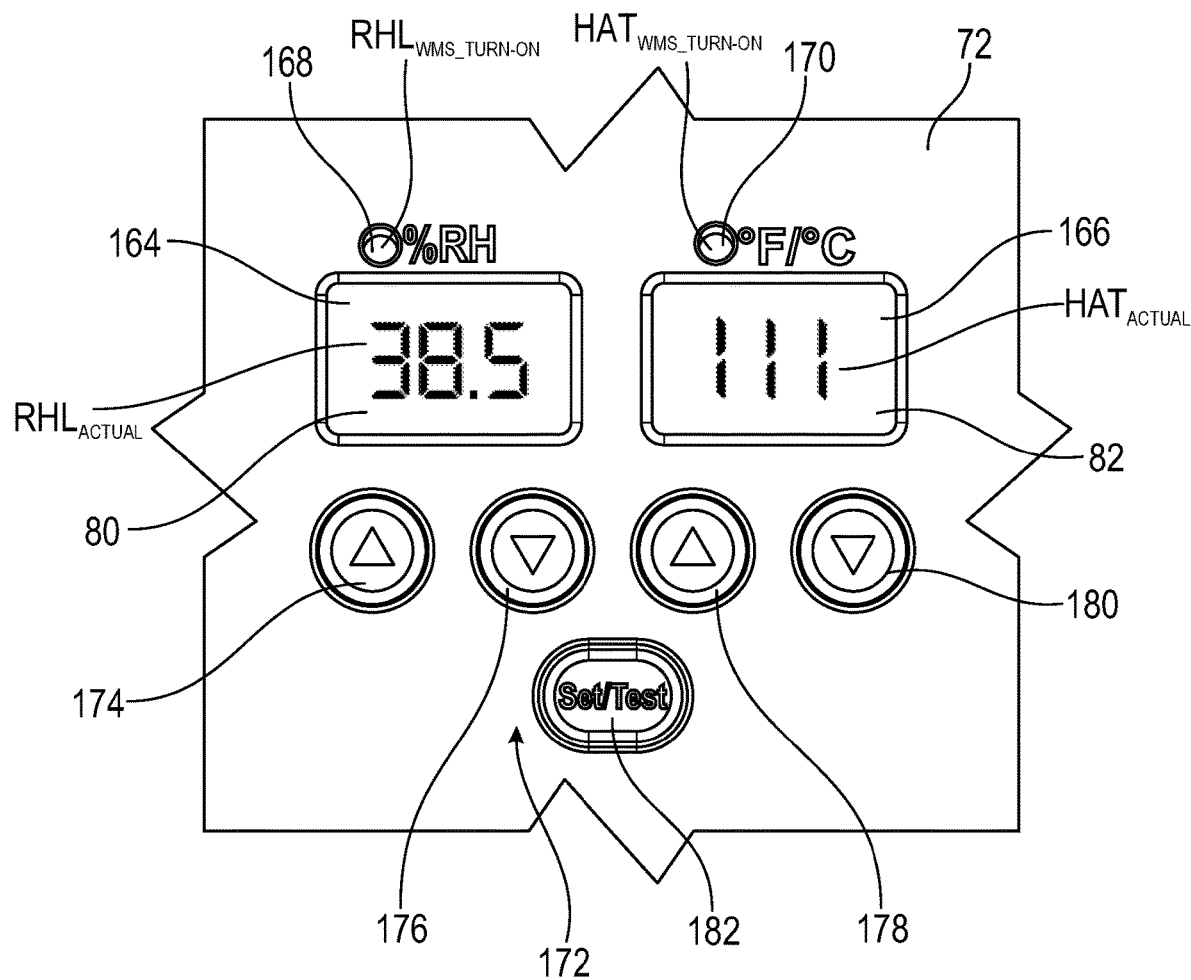
FIG. 13 is a partial front view of the humidifier showing a user interface of the humidifier, and further showing relative humidity level information and heated air temperature information being displayed from respective LED displays through respective display windows of the cover of the housing assembly.

As shown particularly in FIG. 13 and schematically shown in FIGS. 11, 12 and 16, when the forced-air heating system 200 operates to generate the heated air that is circulated (e.g., by the blower of the forced-air heating system 200) to flow throughout the home or other building so as to heat the home or other building, the humidity sensor HS may sense or otherwise determine an actual relative humidity level $RHL_{ACTUAL}$ of the air within the living space (e.g., a room in the home or other building) or in the return air plenum (not shown) of the forced-air heating system 200 such that the sensed actual relative humidity level $RHL_{ACTUAL}$ is communicated to the control printed circuit board assembly (PCBA) 156 of the humidifier 10. As shown particularly in FIG. 13, the sensed actual relative humidity level $RHL_{ACTUAL}$ communicated to the control printed circuit board assembly (PCBA) 156 of the humidifier 10 may then be displayed on the first LED display 164 (e.g., during a majority of the time when the humidifier 10 is powered on, unless the user is adjusting or changing a setting by way of the user interface 172). Similarly, when the forced-air heating system 200 operates to generate the heated air that is circulated to flow throughout the home or other building so as to heat the home or other building, the air temperature sensor 152 of the humidifier 10 may sense or otherwise determine an actual heated air temperature $HAT_{ACTUAL}$ of the heated air that flows through the interior of the component 202 of the forced-air heating system 200 such that the sensed actual heated air temperature $HAT_{ACTUAL}$ is communicated to the control printed circuit board assembly (PCBA) 156 of the humidifier 10. As shown particularly in FIG. 13, the sensed actual heated air temperature $HAT_{ACTUAL}$ communicated to the control printed circuit board assembly (PCBA) 156 of the humidifier 10 may then be displayed on the second LED display 166 (e.g., during a majority of the time when the humidifier 10 is powered on, unless the user is adjusting or changing a setting by way of the user interface 172).

With further regard to the air temperature sensor 152 of the humidifier 10 sensing or otherwise determining the actual heated air temperature $HAT_{ACTUAL}$ of the heated air that flows through the interior of the component 202 of the forced-air heating system 200, as collectively shown in FIGS. 1B, 2C, 5B, 5D, 5E, 11 and 16, the plurality of air flow openings 132 formed in the main body 102 of the water mist spraying unit 100 may be capable of receiving therethrough at least some of the heated air that flows through the interior of the component 202 of the forced-air heating system 200 and a part of at least a portion of the air temperature sensor 152 that is disposed within the air temperature sensor-receiving cavity 124 formed in the main body 102 of the water mist spraying unit 100 may be capable of being directly exposed to at least some of the heated air that flows through the interior of the component 202 of the forced-air heating system 200 by way of the plurality of air access openings 128 formed in the main body 102 of the water mist spraying unit 100. Furthermore, in this regard, the plurality of air flow openings 132 formed in the main body 102 of the water mist spraying unit 100 may be advantageously capable of allowing at least some of the heated air that flows through the interior of the component 202 of the forced-air heating system 200 to flow through and around the main body 102 of the water mist spraying unit 100 (i.e., including around the portion of the air temperature sensor 152 that is disposed within the air temperature sensor-receiving cavity 124 formed in the main body 102) in a relatively efficient manner (i.e., with optimal high air flow), regardless of a flow direction of the heated air that flows through the interior of the component 202 of the forced-air heating system 200. Furthermore, in this regard, since at least some of the heated air that flows through the interior of the component 202 of the forced-air heating system 200 may be allowed to flow through and around the main body 102 of the water mist spraying unit 100 (i.e., through the plurality of air flow openings 132) in a relatively efficient manner (i.e., with optimal high air flow), the plurality of air access openings 128 formed in the main body 102 of the water mist spraying unit 100 may advantageously allow the part of at least the portion of the air temperature sensor 152 that is disposed within the air temperature sensor-receiving cavity 124 formed in the main body 102 of the water mist spraying unit 100 to sense or otherwise obtain a more accurate actual heated air temperature $HAT_{ACTUAL}$ by way of the direct exposure (i.e., through the plurality of air access openings 128) to at least some of the heated air that flows through the interior of the component 202 of the forced-air heating system 200.

As schematically shown in FIG. 12, when the sensed actual relative humidity level $RHL_{ACTUAL}$ and the sensed actual heated air temperature $HAT_{ACTUAL}$ are communicated to the control printed circuit board assembly (PCBA) 156 of the humidifier 10 from the respective humidity sensor HS and air temperature sensor 152, the control printed circuit board assembly (PCBA) 156 may then compare the desired relative humidity level pre-set value $RHL_{PRE-SET}$ and the desired heated air temperature pre-set value $HAT_{PRE-SET}$ (i.e., as set by the user) with the respective sensed actual relative humidity level $RHL_{ACTUAL}$ and sensed actual heated air temperature $HAT_{ACTUAL}$ so as to determine if water mist spray turn-on conditions (i.e., a relative humidity level water mist spray turn-on condition $RHL_{WMS\_TURN-ON}$ and a heated air temperature water mist spray turn-on condition $HAT_{WMS\_TURN-ON}$) are met. More specifically, in order for the relative humidity level water mist spray turn-on condition $RHL_{WMS\_TURN-ON}$ to be met, as a non-limiting example, the sensed actual relative humidity level $RHL_{ACTUAL}$ is less than (<) the desired relative humidity level pre-set value $RHL_{PRE-SET}$. Moreover, in order for the heated air temperature water mist spray turn-on condition $HAT_{WMS\_TURN-ON}$ to be met, as a non-limiting example, the sensed actual heated air temperature $HAT_{ACTUAL}$ is equal to or greater than (>) the desired heated air temperature pre-set value $HAT_{PRE-SET}$. As shown particularly in FIG. 13, when the relative humidity level water mist spray turn-on condition $RHL_{WMS\_TURN-ON}$ is met, the first LED indicator light source 168 may emit light (e.g., a green colored light) so as to advantageously visually indicate the relative humidity level water mist spray turn-on condition $RHL_{WMS\_TURN-ON}$ is met. Similarly, when the heated air temperature water mist spray turn-on condition $HAT_{WMS\_TURN-ON}$ is met, the second LED indicator light source 170 may emit light (e.g., a green colored light) so as to advantageously visually indicate the heated air temperature water mist spray turn-on condition $HAT_{WMS\_TURN-ON}$ is met is met. When both of the relative humidity level water mist spray turn-on condition $RHL_{WMS\_TURN-ON}$ and the heated air temperature water mist spray turn-on condition $HAT_{WMS\_TURN-ON}$ are met (i.e., visually indicated by both of the first and second LED indicator light sources 168, 170 emitting light), the control printed circuit board assembly (PCBA) 156 of the humidifier 10 may then control the electronically controlled water supply valve 142 of the humidifier 10 (i.e., such as in the manner as previously discussed herein), and the electronically controlled water supply valve (not shown) of the one or more auxiliary humidifiers 10' (if optionally installed) (i.e., such as in the manner as previously discussed herein), so as to start spraying water mist WM into the heated air that flows through the interior of the component 202 of the forced-air heating system 200.

As shown particularly in FIG. 2D and schematically shown in FIGS. 11 and 16, when the panel 44 of the housing assembly 12 of the humidifier 10 is in the closed position and the humidifier 10 operates so as to spray water mist WM into the heated air that flows through the interior of the component 202 of the forced-air heating system 200, the water mist spraying unit 100 of the humidifier 10 may advantageously be viewable by the user through the observation windows 78, 50, 22 of the respective cover 72, panel 44 and mounting frame 14 of the housing assembly 12. More specifically, at least the plurality of spray nozzles 136 (i.e., the fanned array of spray nozzles 136) of the water mist spraying unit 100 may be viewable through the observation windows 78, 50, 22 of the respective cover 72, panel 44 and mounting frame 14 of the housing assembly 12 by way of an unobstructed line-of-sight LOS leading directly towards the plurality of spray nozzles 136 (i.e., the fanned array of spray nozzles 136) of the water mist spraying unit 100. As previously discussed herein, the observation windows 78, 50, 22 of the respective cover 72, panel 44 and mounting frame 14 of the housing assembly 12 may be at least generally aligned with one another, or substantially aligned with one another, when the panel 44 of the housing assembly 12 is in the closed position. In either case, whether the observation windows 78, 50, 22 of the respective cover 72, panel 44 and mounting frame 14 of the housing assembly 12 are at least generally aligned with one another or are substantially aligned with one another, the line-of-sight LOS leading directly towards the plurality of spray nozzles 136 (i.e., the fanned array of spray nozzles 136) of the water mist spraying unit 100 is unobstructed such that the user is able to clearly and easily view each of the plurality of spray nozzles 136 (i.e., the fanned array of spray nozzles 136) of the water mist spraying unit 100 in an unobstructed manner. In this regard, as collectively shown particularly in FIGS. 1B, 2B and 2D, with the plurality of LED light sources 194 of the spray nozzle lighting unit 188 emitting light (i.e., the plurality of light beams LB1 projecting through the respective plurality of LED light source openings 32 formed in the generally recessed lighting unit support portion 26 of the mounting frame 14 of the housing assembly 12) directly towards the plurality of spray nozzles 136 (i.e., the fanned array of spray nozzles 136) of the water mist spraying unit 100, the user may advantageously view the illuminated plurality of spray nozzles 136 and the illuminated water mist WM that is sprayed therefrom to verify proper operation (i.e., proper spraying of the water mist WM) of the water mist spraying unit 100. Furthermore, in this regard, the viewability of the illuminated plurality of spray nozzles 136 (i.e., the fanned array of spray nozzles 136) of the water mist spraying unit 100 and the illuminated water mist WM sprayed therefrom, as just described herein, may also apply to the one or more auxiliary humidifiers 10' (if optionally installed).

With further regard to the humidifier 10 operating so as to spray water mist WM into the heated air that flows through the interior of the component 202 of the forced-air heating system 200, it is to be appreciated that at least the portion of the air temperature sensor 152 that is disposed within the air temperature sensor-receiving cavity 124 formed in the main body 102 of the water mist spraying unit 100 is advantageously positioned/disposed so as to be capable of being shielded from water mist WM, when the water mist WM is sprayed from the plurality of spray nozzles 136 (i.e., the fanned array of spray nozzles 136) of the water mist spraying unit 100 into the heated air that flows through the interior of the component 202 of the forced-air heating system 200, regardless of a flow direction of the heated air that flows through the interior of the component 202 of the forced-air heating system 200 (i.e., regarding the flow direction, it is advantageously not necessary or not required that the air temperature sensor 152 be disposed or otherwise located upstream (in the flow of the heated air that flows through the interior of the component 202 of the forced-air heating system 200) with respect to the plurality of spray nozzles 136 of the water mist spraying unit 100). More specifically, as collectively shown in FIGS. 1B, 2C, 5B, 5D, 5E, 11 and 16, as previously discussed herein, the plurality of walls 130 of the main body 102 of the water mist spraying unit 100 may be disposed proximate the plurality of air access openings 128 formed in the main body 102 of the water mist spraying unit 100 and may advantageously at least partially or fully surround the plurality of air access openings 128. In this regard, the plurality of walls 130 of the main body 102 of the water mist spraying unit 100 may advantageously shield at least the plurality of air access openings 128 formed in the main body 102 of the water mist spraying unit 100 from any water mist WM that may spray or otherwise flow near the plurality of air access openings 128 formed in the main body 102. As a result, at least the portion of the air temperature sensor 152 that is disposed within the air temperature sensor-receiving cavity 124 formed in the main body 102 of the water mist spraying unit 100 may advantageously be shielded from the water mist WM sprayed from the water mist spraying unit 100. Moreover, the part of at least the portion of the air temperature sensor 152 that is disposed within the air temperature sensor-receiving cavity 124 formed in the main body 102 of the water mist spraying unit 100 that is capable of being directly exposed to at least some of the heated air that flows through the interior of the component 202 of the forced-air heating system 200 (i.e., by way of the plurality of air access openings 128) may advantageously also be shielded from any water mist WM sprayed from the water mist spraying unit 100, by way of the plurality of walls 130 of the main body 102 of the water mist spraying unit 100 at least partially or fully surrounding the plurality of air access openings 128 formed in the main body 102 of the water mist spraying unit 100. Moreover, as shown particularly in FIG. 5D, it is to be further appreciated that with the plurality of spray nozzles 136 of the water mist spraying unit 100 being fanned (i.e., each of the plurality of spray nozzles 136 being aimed in a different respective direction) such that the angle $\alpha 2$ defined between the respective centerlines CL2 of the centermost spray nozzle 136 and the farthest-from-center spray nozzle 136 is preferably 60° maximum, or less than 60°, the plurality of spray nozzles 136 may therefore advantageously spray and distribute the water mist WM in such a manner as to avoid the area of the water mist spraying unit 100 where the air temperature sensor 152 of the humidifier 10 is disposed/located. In this regard, considering (i) the advantages of at least a portion of the air temperature sensor 152 being disposed within the main body 102 of the water mist spraying unit 100, (ii) the advantages provided by the angle $\alpha 2$ defined between the respective centerlines CL2 of the centermost spray nozzle 136 and the farthest-from-center spray nozzle 136 being preferably 60° maximum, or less than 60° and (iii) the advantages provided by the plurality of walls 130 of the main body 102 of the water mist spraying unit 100, the air temperature sensor 152 of the humidifier 10 may therefore be advantageously shielded from the water mist WM sprayed from the water mist spraying unit 100 so as to avoid direct contact with the water mist WM, which could otherwise adversely affect the accuracy or function of the air temperature sensor 152, as may be understood by one skilled in the art. Furthermore, since it is not necessary or not required that the air temperature sensor 152 be disposed or otherwise located upstream (i.e., in the flow of the heated air that flows through the interior of the component 202 of the forced-air heating system 200) with respect to the plurality of spray nozzles 136 of the water mist spraying unit 100 in order for the air temperature sensor 152 to be shielded from the water mist WM sprayed from the water mist spraying unit 100, the humidifier 10 may therefore be advantageously mounted on the forced-air heating system 200 at various locations in an upright orientation (i.e., in a manner such that the first and second LED displays 164, 166, the user interface 172, etc. are upright) regardless of the flow direction of the heated air that flows through the interior of the component 202 of the forced-air heating system 200.

Figure 14:
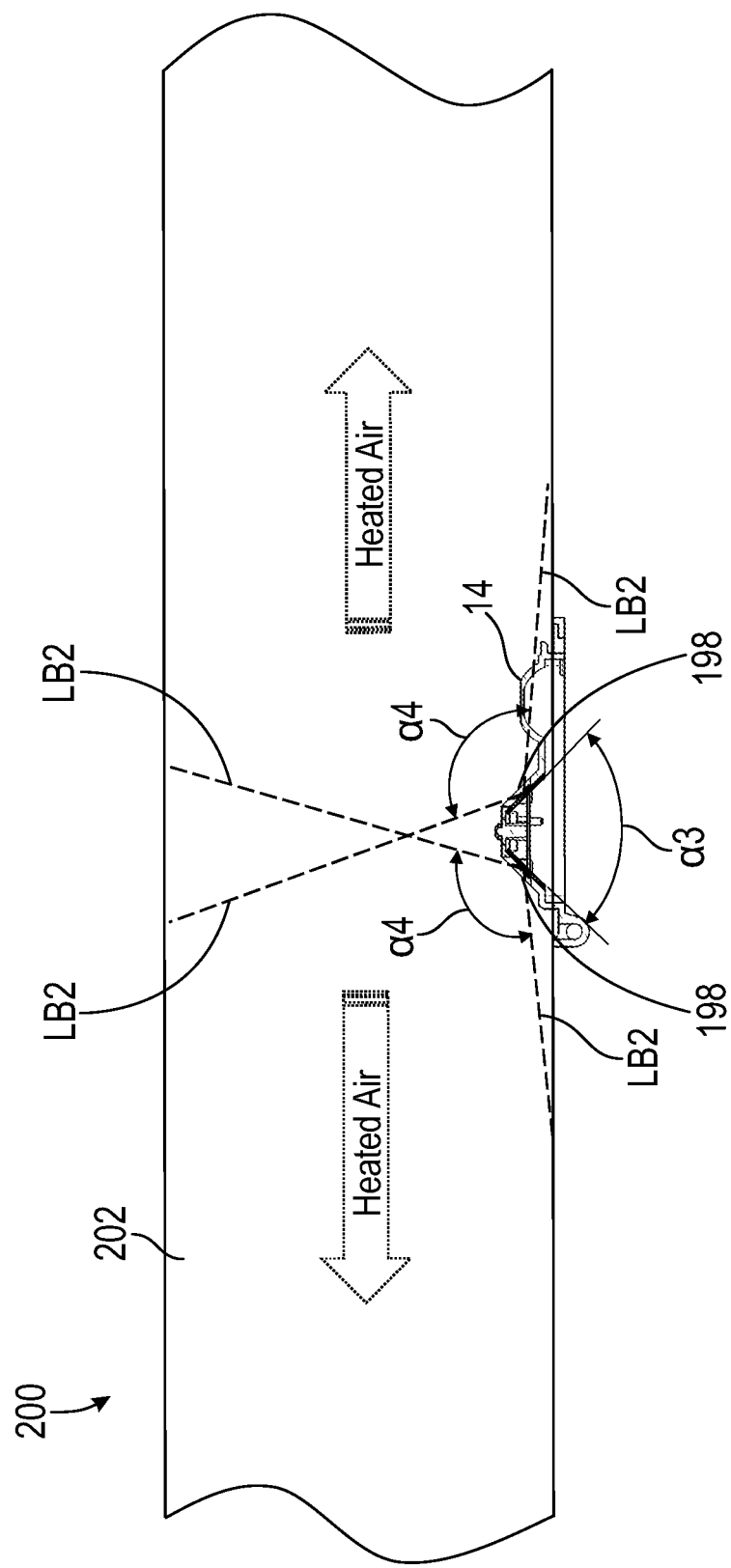
FIG. 14 is a schematic diagram schematically showing the mounting frame of the housing assembly attached to a component of the forced-air heating system, and further schematically showing light beam projections of light sources of the sterilization lighting unit within an interior of the component.

With further regard to the humidifier 10 operating so as to spray water mist WM into the heated air that flows through the interior of the component 202 of the forced-air heating system 200, as previously discussed herein, it is to be appreciated that the plurality of UV-C light sources 198 of the sterilization lighting unit 196 of the humidifier 10 are advantageously capable of emitting the plurality of wide-angle UV-C light beams LB2 into the interior of the component 202 of the forced-air heating system 200 when the water mist spraying unit 100 of the humidifier 10 sprays water mist WM into the heated air that flows through the interior of the component 202 of the forced-air heating system 200. As schematically shown in FIG. 14, since each of the plurality of UV-C light sources 198 of the sterilization lighting unit 196 may be angled with respect to one another (e.g., so as to be substantially perpendicular with respect to one another), as previously discussed herein, each of the plurality of wide-angle UV-C light beams LB2 are advantageously capable of covering or spanning the area defined by the relatively wide angle $\alpha 4$, which is preferably 120° or about 120°. In this regard, the plurality of wide-angle UV-C light beams LB2 emitted by the respective plurality of UV-C light sources 198 of the sterilization lighting unit 196 are together advantageously capable of covering or spanning substantially the entire area (i.e., proximate the humidifier 10) disposed within the interior of the component 202 of the forced-air heating system 200. Furthermore, in this regard, as schematically shown in FIG. 14, the plurality of wide-angle UV-C light beams LB2 may therefore sanitize at least the heated air that flows through the interior of the component 202 of the forced-air heating system 200, the water mist WM that is sprayed into the heated air that flows through the interior of the component 202, and various surrounding components and/or surfaces of the humidifier 10 and the forced-air heating system 200 without the use of harmful chemicals, while still rendering bacteria, viruses, fungi, mold spores, etc. inactive. Moreover, it is to be further appreciated that when the humidifier 10 is powered off and the forced-air heating system 200 is not being employed to generate the heated air that flows through the interior of the component 202 of the forced-air heating system 200 (e.g., during warmer months of the year), the sterilization lighting unit 196 of the humidifier 10 may be electrically disconnected from being in electrical communication with the control printed circuit board assembly (PCBA) 156 of the humidifier 10 and may instead be electrically connected to the blower of the forced-air heating system 200 such that when a central air conditioning (A/C) unit (not shown) operates to generate cooled air that flows through the interior of the component 202 of the forced-air heating system 200, the sterilization lighting unit 196 of the humidifier 10 may advantageously sterilize the cooled air that flows through the interior of the component 202 of the forced-air heating system 200 without the humidifier 10 spraying water mist WM. The sanitization provided by the sterilization lighting unit 196 of the humidifier 10, as just described herein, may also apply to the one or more auxiliary humidifiers 10' (if optionally installed).

As shown particularly in FIG. 10, if the user desires to perform maintenance on the humidifier 10 (e.g., inspecting, removing or replacing one or more of the plurality of spray nozzles 136 of the water mist spraying unit 100, etc.) or desires to open the humidifier 10 for any other reason, the panel 44 of the housing assembly 12 may be advantageously quickly and easily moved (i.e., pivoted) to the open position (i.e., by removing two of the plurality of mounting fasteners 98 and disengaging the latch mechanism LM of the housing assembly 12) in which the water mist spraying unit 100 is disposed away from the mounting frame 14 of the housing assembly 12 and out of the main opening 20 formed in the mounting frame 14. In this regard, at least the internal components of the humidifier 10, including at least the water mist spraying unit 100, may be advantageously quickly and easily accessed by the user when the panel 44 of the housing assembly 12 is in the open position (i.e., advantageously without entirely dismounting or otherwise substantially uninstalling the humidifier 10), as may be understood by one skilled in the art. Furthermore, in this regard, the open position of the panel 44 of the housing assembly 12 and the resulting positioning of the water mist spraying unit 100 of the humidifier 10, as just described herein, may also apply to the one or more auxiliary humidifiers 10' (if optionally installed).

While one or more exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure.

With regard to any processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

What is claimed is:

1. A humidifier for use with a forced-air heating system, the humidifier comprising:
    a housing assembly including a mounting frame including a main opening formed therein, the housing assembly further including a panel configured to be movable between a closed position and an open position with respect to the mounting frame, the panel including an observation window, the housing assembly further including a cover attached to the panel, the cover including an observation window at least generally aligned with the observation window of the panel; and
    a water mist spraying unit carried by the panel of the housing assembly, the water mist spraying unit including at least one spray nozzle;
    wherein when the panel of the housing assembly is in the closed position, the water mist spraying unit extends through the main opening formed in the mounting frame of the housing assembly and the at least one spray nozzle of the water mist spraying unit is viewable through at least the observation windows of the cover and the panel of the housing assembly; and
    wherein when the panel of the housing assembly is in the open position, the water mist spraying unit is disposed away from the mounting frame of the housing assembly and out of the main opening formed in the mounting frame.

2. The humidifier according to claim 1, wherein the mounting frame of the housing assembly is configured to be attached to an air duct or a supply plenum of the forced-air heating system at or near a cutout formed in the air duct or the supply plenum.

3. The humidifier according to claim 1, wherein the mounting frame of the housing assembly further includes an observation window disposed adjacent to the main opening formed in the mounting frame, the observation window of the mounting frame being at least generally aligned with the observation windows of the panel and the cover of the housing assembly when the panel is in the closed position, and wherein when the panel is in the closed position, the at least one spray nozzle of the water mist spraying unit is viewable through the observation windows of the cover, the panel and the mounting frame.

4. The humidifier according to claim 1, wherein the at least one spray nozzle of the water mist spraying unit comprises a plurality of spray nozzles forming a fanned array of spray nozzles, and wherein when the panel of the housing assembly is in the closed position, the fanned array of spray nozzles are viewable through at least the observation windows of the cover and the panel of the housing assembly.

5. The humidifier according to claim 1, wherein the cover of the housing assembly further includes at least one of (i) a display window through which relative humidity level information is able to be displayed, (ii) a display window through which heated air temperature information is able to be displayed, (iii) at least one user interface opening formed in the cover exposing at least a part of a user interface of the humidifier and (iv) a main water inlet opening formed in the cover exposing a main water inlet of the humidifier.

6. The humidifier according to claim 1, further comprising at least one of (i) at least one light source configured to emit light directly towards the at least one spray nozzle of the water mist spraying unit and (ii) at least one light source capable of sterilizing at least a water mist that is sprayed from the water mist spraying unit and heated air that flows through the forced-air heating system.

7. A humidifier for use with a forced-air heating system, the humidifier comprising:
   a water mist spraying unit including a main body including an air temperature sensor-receiving cavity formed therein, the main body further including at least one air access opening formed therein, the at least one air access opening intersecting the air temperature sensor-receiving cavity, the water mist spraying unit further including at least one spray nozzle in fluid communication with the main body, the at least one spray nozzle being capable of spraying a water mist into heated air that flows through the forced-air heating system; and an air temperature sensor capable of sensing a temperature of the heated air that flows through the forced-air heating system;

wherein at least a portion of the air temperature sensor is disposed within the air temperature sensor-receiving cavity formed in the main body of the water mist spraying unit; and wherein a part of the at least a portion of the air temperature sensor that is disposed within the air temperature sensor-receiving cavity is capable of being directly exposed to at least some of the heated air that flows through the forced-air heating system by way of the at least one air access opening formed in the main body of the water mist spraying unit.

8. The humidifier according to claim 7, wherein the humidifier is configured to be attached to an air duct or a supply plenum of the forced-air heating system at or near a cutout formed in the air duct or the supply plenum.

9. The humidifier according to claim 7, wherein the main body of the water mist spraying unit further includes a water inlet and at least one water flow channel formed therein in fluid communication with the water inlet and the at least one spray nozzle of the water mist spraying unit.

10. The humidifier according to claim 9, wherein the main body of the water mist spraying unit further includes at least one water flow channel cap covering and sealing, in a watertight manner, at least a portion of the at least one water flow channel formed in the main body, and wherein the at least one water flow channel cap is permanently fixed to the main body.

11. The humidifier according to claim 7, wherein the main body of the water mist spraying unit further includes at least one wall protruding from the main body, the at least one wall at least partially surrounding the at least one air access opening formed in the main body, and wherein the at least one wall is capable of shielding the at least one air access opening from the water mist when the water mist is sprayed from the at least one spray nozzle of the water mist spraying unit into the heated air that flows through the forced-air heating system.

12. The humidifier according to claim 7, wherein the main body of the water mist spraying unit further includes a plurality of air flow openings formed therein, the plurality of air flow openings being disposed adjacent to at least the air temperature sensor-receiving cavity, and wherein the plurality of air flow openings are capable of receiving therethrough at least some of the heated air that flows through the forced-air heating system.

13. A humidifier for use with a forced-air heating system, the humidifier comprising:

a housing assembly including a mounting frame including a main opening formed therein, the mounting frame further including a lighting unit support portion disposed adjacent to the main opening formed in the mounting frame, the lighting unit support portion including at least one light source opening formed therein, the housing assembly further including a cover attached thereto;

a water mist spraying unit carried by the housing assembly so as to be capable of extending through the main opening formed in the mounting frame of the housing assembly; and a lighting unit including at least one light source, the lighting unit being disposed at the lighting unit support portion of the main frame of the housing assembly such that the at least one light source is capable of emitting light through the at least one light source opening formed in the lighting unit support portion of the main frame of the housing assembly.

14. A humidifier for use with a forced-air heating system, the humidifier comprising:

a water mist spraying unit including a main body including an air temperature sensor-receiving cavity formed therein, the main body further including a plurality of air flow openings formed therein, the plurality of air flow openings being disposed adjacent to at least the air temperature sensor-receiving cavity, the water mist spraying unit further including at least one spray nozzle in fluid communication with the main body, the at least one spray nozzle being capable of spraying a water mist into heated air that flows through the forced-air heating system; and an air temperature sensor capable of sensing a temperature of the heated air that flows through the forced-air heating system;

wherein at least a portion of the air temperature sensor is disposed within the air temperature sensor-receiving cavity formed in the main body of the water mist spraying unit; and wherein the plurality of air flow openings formed in the main body of the water mist spraying unit are capable of receiving therethrough at least some of the heated air that flows through the forced-air heating system.

15. A humidifier for use with a forced-air heating system, the humidifier comprising:

a water mist spraying unit including a main body, the main body including a water inlet, at least one water flow channel in fluid communication with the water inlet, and at least one water outlet in fluid communication with the at least one water flow channel, the main body being capable of allowing a flow of water supplied thereto to (i) flow into the main body by way of the water inlet, (ii) flow internally within the main body by way of the at least one water flow channel, and (iii) flow out of the main body by way of the at least one water outlet, the water mist spraying unit further including at least one spray nozzle in fluid communication with the at least one water outlet of the main body, the at least one spray nozzle being capable of spraying a water mist into heated air that flows through the forced-air heating system; and an air temperature sensor including a main body, the air temperature sensor being capable of sensing a temperature of the heated air that flows through the forced-air heating system; and wherein at least a portion of the main body of the air temperature sensor is disposed within the main body of the water mist spraying unit.

16. The humidifier according to claim 15, further comprising a housing assembly configured to be attached to an air duct or a supply plenum of the forced-air heating system at or near a cutout formed in the air duct or the supply plenum, wherein the main body of the water mist spraying unit is carried by the housing assembly, and wherein at least a portion of the main body of the water mist spraying unit is configured to extend into an interior of the air duct or the supply plenum when the housing assembly is attached to the air duct or the supply plenum at or near the cutout formed in the air duct or the supply plenum.

17. The humidifier according to claim 15, wherein the main body of the water mist spraying unit further includes an air temperature sensor-receiving cavity formed therein, and wherein the at least a portion of the main body of the air temperature sensor that is disposed within the main body of the water mist spraying unit is disposed within the air temperature sensor-receiving cavity.

18. The humidifier according to claim 15, wherein the at least a portion of the main body of the air temperature sensor that is disposed within the main body of the water mist spraying unit comprises more than half of the entire main body of the air temperature sensor.

19. A humidifier for use with a forced-air heating system, the humidifier comprising:
- a water mist spraying unit including a main body, the main body having a front end, a rear end opposing the front end, a top side, and a bottom side opposing the top side, the main body further including a water inlet, at least one water flow channel in fluid communication with the water inlet, and at least one water outlet in fluid communication with the at least one water flow channel, the at least one water outlet being disposed at the rear end of the main body, the main body being capable of allowing a flow of water supplied thereto to (i) flow into the main body by way of the water inlet, (ii) flow internally within the main body by way of the at least one water flow channel, and (iii) flow out of the main body by way of the at least one water outlet, the water mist spraying unit further including at least one spray nozzle in fluid communication with the at least one water outlet of the main body, the at least one spray nozzle being capable of spraying a water mist into heated air that flows through the forced-air heating system; and
- an air temperature sensor including a main body, the air temperature sensor being capable of sensing a temperature of the heated air that flows through the forced-air heating system; and
- wherein at least a portion of the main body of the water mist spraying unit and at least a portion of the main body of the air temperature sensor overlap with each other when viewed from a top plan view of the humidifier.

20. The humidifier according to claim 19, further comprising a housing assembly configured to be attached to an air duct or a supply plenum of the forced-air heating system at or near a cutout formed in the air duct or the supply plenum, wherein the main body of the water mist spraying unit is carried by the housing assembly, and wherein at least the rear end of the main body of the water mist spraying unit is configured to extend into an interior of the air duct or the supply plenum when the housing assembly is attached to the air duct or the supply plenum at or near the cutout formed in the air duct or the supply plenum.

21. The humidifier according to claim 19, wherein the main body of the air temperature sensor is disposed forward of the at least one spray nozzle of the water mist spraying unit.

22. The humidifier according to claim 19, wherein the main body of the air temperature sensor is disposed directly in front of the at least one spray nozzle of the water mist spraying unit.

* * * * *

UNITED STATES PATENT AND TRADEMARK OFFICE
CERTIFICATE OF CORRECTION

PATENT NO. : 11,293,651 B1
APPLICATION NO. : 17/355168
DATED : April 5, 2022
INVENTOR(S) : Yong Qiang Wang Page 1 of 1

It is certified that error appears in the above-identified patent and that said Letters Patent is hereby corrected as shown below:

In the Specification

In Column 17, Line 14, "$RHL_{PER\text{-}SET}$" should read -- $RHL_{PRE\text{-}SET}$ --

In Column 17, Line 28, "$HAT_{WMS\_TuRN\text{-}ON}$" should read -- $HAT_{WMS\_TURN\text{-}ON}$ --

Signed and Sealed this
Twenty-seventh Day of August, 2024

Katherine Kelly Vidal
*Director of the United States Patent and Trademark Office*